(12) United States Patent
Hashimoto et al.

(10) Patent No.: US 8,306,429 B2
(45) Date of Patent: Nov. 6, 2012

(54) OPTICAL ULTRASONIC MICROPHONE

(75) Inventors: Masahiko Hashimoto, Osaka (JP);
Hidetomo Nagahara, Kyoto (JP);
Takehiko Suginouchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 12/602,191

(22) PCT Filed: Mar. 30, 2009

(86) PCT No.: PCT/JP2009/001454
§ 371 (c)(1),
(2), (4) Date: Nov. 30, 2009

(87) PCT Pub. No.: WO2010/116398
PCT Pub. Date: Oct. 14, 2010

(65) Prior Publication Data
US 2011/0123199 A1    May 26, 2011

(51) Int. Cl.
*H04B 10/02* (2006.01)

(52) U.S. Cl. ........ 398/132; 398/133; 398/134; 398/135; 398/140

(58) Field of Classification Search .......... 398/132–135, 398/140
See application file for complete search history.

(56) References Cited

U.S. PATENT DOCUMENTS

| | | | | |
|---|---|---|---|---|
| 5,249,163 A * | 9/1993 | Erickson | ........................ | 367/149 |
| 5,995,260 A * | 11/1999 | Rabe | .......................... | 398/115 |
| 6,014,239 A * | 1/2000 | Veligdan | ..................... | 398/134 |
| 6,147,787 A * | 11/2000 | Veligdan | ..................... | 398/133 |
| 6,154,551 A * | 11/2000 | Frenkel | ......................... | 381/172 |
| 6,301,034 B1 * | 10/2001 | Speciale | ....................... | 398/134 |
| 7,162,930 B2 * | 1/2007 | Hashimoto et al. | ........ | 73/861.25 |
| 7,565,842 B2 * | 7/2009 | Nagahara et al. | ................ | 73/617 |
| 8,042,398 B2 * | 10/2011 | Nagahara et al. | ................ | 73/617 |
| 2005/0139013 A1 * | 6/2005 | Hashimoto et al. | ........ | 73/861.27 |
| 2007/0268783 A1 | 11/2007 | Okuda et al. | | |
| 2008/0163691 A1 | 7/2008 | Nagahara et al. | | |
| 2009/0257753 A1 * | 10/2009 | Fischer | ........................ | 398/133 |

(Continued)

FOREIGN PATENT DOCUMENTS

JP          59-157620          9/1984

(Continued)

OTHER PUBLICATIONS

International Preliminary Report on Patentability & Written Opinion of the International Searching Authority (in English) issued Nov. 15, 2011 in International (PCT) Application No. PCT/JP2009/001454.

(Continued)

*Primary Examiner* — Kenneth N Vanderpuye
*Assistant Examiner* — Hibret Woldekidan
(74) *Attorney, Agent, or Firm* — Wenderoth, Lind & Ponack, L.L.P.

(57) ABSTRACT

An optical ultrasonic microphone includes an acoustic waveguide that transmits a sound wave received from an opening, an optical acoustic propagation medium that forms at least one portion of a wall face of the acoustic waveguide and an LDV head, and a sound wave proceeding through the acoustic waveguide is received by the optical acoustic propagation medium so that a change in the refractive index caused by the proceeding sound wave inside the optical acoustic propagation medium is generated with high efficiency, and by detecting this as an optical modulation by the LDV head, the optical ultrasonic microphone is allowed to have a very wide band.

13 Claims, 20 Drawing Sheets

U.S. PATENT DOCUMENTS

2012/0204649 A1* 8/2012 Iwamoto et al. ................ 73/643

FOREIGN PATENT DOCUMENTS

| JP | 05-227597 | 9/1993 |
| JP | 08-265262 | 10/1996 |
| JP | 2003-230196 | 8/2003 |
| JP | 2004-012421 | 1/2004 |
| JP | 2004-279259 | 10/2004 |
| JP | 2006-067219 | 3/2006 |
| JP | 2007-306043 | 11/2007 |
| JP | 2009-021852 | 1/2009 |
| WO | 2004/098234 | 11/2004 |
| WO | 2007/132728 | 11/2007 |

OTHER PUBLICATIONS

M. Hashimoto et al., "Acoustic Properties of Nanofoam Material and its Applied Ultrasonic Sensors", Technical Research Report of the Institute of Electronics, Information and Communication Engineers, vol. 105, No. 619, US2005-127, pp. 29-34, Feb. 2005 (with partial English translation).

* cited by examiner

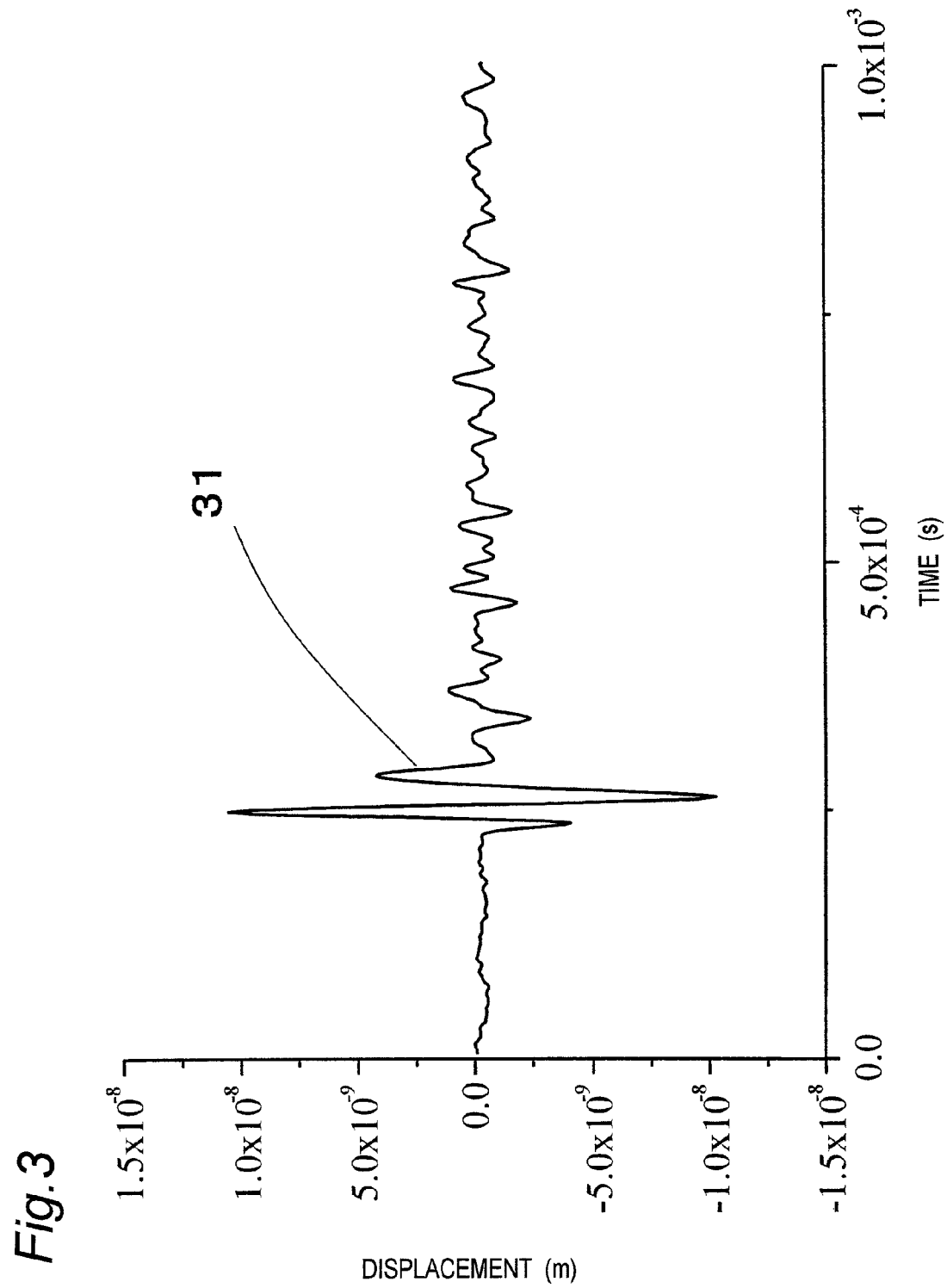

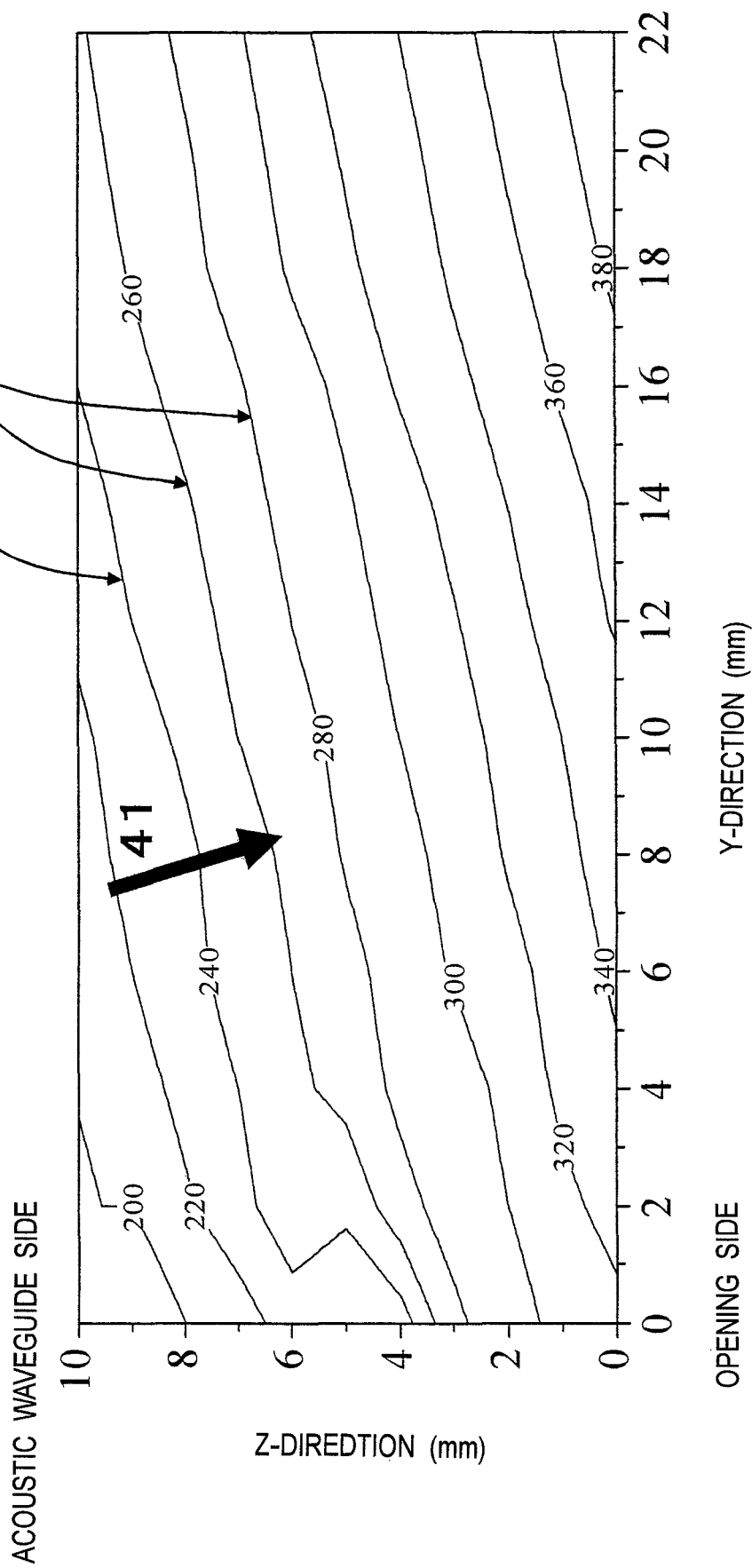

OPTICAL ULTRASONIC MICROPHONE

TECHNICAL FIELD

The present invention relates to a microphone that utilizes light, and in particular, relates to an optical ultrasonic microphone that receives an ultrasonic wave propagated through a gas such as air, and converts the received ultrasonic wave into an electric signal by utilizing light.

BACKGROUND ART

As devices that collect a sound wave and convert the sound wave to an electric signal, a dynamic microphone or a capacitor microphone has been widely used in the audible band, and a piezoelectric sensor has been widely used in the ultrasonic region. In these devices, by utilizing the fact that a sound wave is derived from minute vibrations of air, the sound wave is made incident on a diaphragm so that minute vibrations generated on the diaphragm by the sound are converted to an electric signal conductively, electrostatically, or piezoelectrically.

On the other hand, an optical system, such as a laser Doppler vibrometer (hereinafter, referred to simply as 'LDV') that measures minute, high-speed vibrations by utilizing light typically represented by laser light, has been widely used, and an attempt has been made to collect sound waves by utilizing such a device.

In a sound pressure converting device as described in Patent Document 1, an optical microphone has been proposed in which a diaphragm used in a normal microphone and optical measurements by the use of an optical triangle method are applied.

Moreover, Patent Document 2 has disclosed a laser Doppler microphone in which, by directly propagating laser light in a sound field, a change in refractive index caused in the air by a sound wave is directly caught by the LDV so that a sound pressure is measured.

Referring to FIG. 11, the following description will discuss the structure and operations of the laser Doppler microphone in Patent Document 2. In FIG. 11, reference numeral 121 represents an LDV, 122 and 123 represent a pair of reflective mirrors, 124 represents a cubic mirror, 125 represents a laser optical path, 126 represents a sound field, and 127 represents an operation unit.

In the structure as shown in FIG. 11, the paired reflective mirrors 122 and 123 are disposed in parallel with each other, and the LDV 121 and the cubic mirror 124 are arranged on the upper and lower ends of one of the reflective mirrors 123. Laser light is projected from the LDV 121 with an appropriate angle toward the reflective mirror 122. The laser light thus projected is propagated along the laser optical path 125, while being reflected by the reflective mirrors 122 and 123 a plurality of times, to reach the cubic mirror 124 arranged on the terminal of the reflective mirror 123. The laser light made incident on the cubic mirror 124 is emitted from the cubic mirror 124 toward the incident direction of the laser beam onto the cubic mirror 124 after having been reflected inside the cubic mirror a plurality of times, and is again propagated through the laser optical path 125 in the reversed direction, while being reflected by the paired reflective mirrors 122 and 123 a plurality of time, to reach the LDV 121. The laser light thus reached the LDV 121 is subjected to optical and electrical treatments inside the LDV 121, and its vibration velocity component is converted by the operation unit 127.

In the structure of FIG. 11, since no vibrating portions are present, normally, the vibration velocity component is zero. In a case where a sound wave is present in a space formed by the reflective mirrors 122 and 123, decreased and increased density portions are generated in the density of air by the sound wave. These changes in the density cause changes in the refractive index in the air and subsequent changes in the propagation velocity of the laser light, with the result that the velocity component corresponding to the sound wave is measured as if vibrations occurred in the reflective mirrors 122 and 123 or in the cubic mirror 124.

Moreover, in Patent Document 3, the present inventors have disclosed an invention relating to an ultrasonic wave transmitter/receiver for a gas that can transmit and receive ultrasonic waves in a wide band with high sensitivity by utilizing the refraction of the ultrasonic wave in the gas. Furthermore, Non-Patent Document 1 has reported transmitting and receiving characteristics in an ultra high frequency region of 500 kHz.

FIG. 12 is a schematic view that shows the ultrasonic wave transmitter/receiver of the inventions disclosed in Patent Document 3 and Patent Document 4.

As shown in FIG. 12, the ultrasonic wave transmitter/receiver 101 of the invention of Patent Document 3 is provided with at least an ultrasonic vibrator 102 and a propagation medium portion 103 that is placed on the front face of the ultrasonic vibrator 102 so that the gap between an environmental fluid 104 and the ultrasonic vibrator 102 is filled therewith. Reference numeral 105 indicates an advancing direction of an ultrasonic wave. The ultrasonic wave transmitter/receiver in this aspect is particularly referred to as a refraction propagation-type ultrasonic wave transmitter/receiver (or diagonal propagation-type ultrasonic wave transmitter/receiver main body).

In this case, the interface between the ultrasonic vibrator 102 and the propagation medium portion 103 is defined as a first surface region 11, and the interface between the propagation medium portion 103 and the environmental fluid 104 is defined as a second surface region 12.

The refraction propagation-type ultrasonic transmitter/receiver of Patent Document 3 is designed so that an ultrasonic wave can be transmitted and received with high sensitivity by receiving an ultrasonic wave with high efficiency to the propagation medium portion of a propagation medium from a medium that is extremely small in its acoustic impedance such as air.

Normally, on the interface between media such as a gas and a solid substance that are greatly different in their acoustic impedances, almost all the ultrasonic waves are reflected, failing to transmit or receive the waves with high sensitivity. In an attempt to realize transmission of an ultrasonic wave in such a gas with high efficiency, the refraction propagation-type ultrasonic wave transmitter/receiver 101 forms an ultrasonic wave transmitter/receiver 101 by utilizing a propagation medium portion 103 made of a special material. The propagation medium portion 103 needs to have characteristics having a sound velocity that is slower than that of the environmental fluid 104 and a density that is greater than that of the environmental fluid 104, and Patent Document 3 uses a dried gel material made of a silica skeleton as such a material. The dried silica gel is a material that is allowed to have various sound velocities and densities by adjusting its manufacturing processes, and, for example, this material can take values that satisfy conditions of the propagation medium portion 103 that can transmit an ultrasonic wave with high efficiency, such as, for example, a density of 200 kg/m$^3$ and a sound velocity of 150 m/s.

By using this material as the propagation medium portion 103, with an angle $\theta_1$, made by the normal to the second surface region 112 and the ultrasonic wave propagation direction inside the propagation medium portion 103, and an angle $\theta_2$ made by the ultrasonic wave propagation direction inside the environmental fluid 104 being respectively selected appropriately, as shown in FIG. 12, the reflection of the ultrasonic wave inside the second surface region 112 is made substantially zero so that it becomes possible to achieve an ultrasonic wave transmitter/receiver with high wave transmitting and receiving sensitivity. Moreover, since the frequency of a sound wave has no relationship with the transmitting efficiency in the second surface region 112, it is possible to achieve a wide band characteristic, on principle, and also to measure various frequencies with high efficiency.

More specifically, upon transmitting an ultrasonic wave, an electric signal is given to the ultrasonic vibrator 102 from a driving circuit not shown to generate an ultrasonic wave. In this case, X, Y, and Z directions are defined as shown in FIG. 12. The ultrasonic wave generated in the ultrasonic vibrator 102 is propagated through the propagation medium portion 103 from the first surface region 111 to the second surface region 112 in the positive direction of the Y-axis. The ultrasonic wave thus reached the second surface region 112 is changed in its propagation direction in accordance with the law of refraction, and then propagated into the fluid 104 toward the direction of the ultrasonic wave propagating path 105 (in this case, direction opposite to the arrow).

Upon receiving an ultrasonic wave, in a manner reversed to the case for transmitting the ultrasonic wave, when the ultrasonic wave propagated through the fluid 104 in the ambient space has reached the second surface region 112, it is refracted and allowed to transmit through the propagation medium portion 103, and is propagated through the inside of the propagation medium portion 103 in the negative direction of the Y-axis to reach the ultrasonic vibrator 102. The ultrasonic wave thus reached the ultrasonic vibrator 102 deforms the ultrasonic vibrator 102 so that an electric potential difference is generated between electrodes, and detected by a wave-receiving circuit, not shown.

In the diagonal propagation-type ultrasonic wave transmitter/receiver main body 101, even in a case where the fluid 104 is a medium that has an extremely small acoustic impedance (sound velocity of a material×density of the material), such as air, an ultrasonic wave can be made incident on the propagation medium portion 103 from the fluid 104 with high efficiency, or can be emitted from the propagation medium portion 103 to the fluid 104 with high efficiency.

In the diagonal propagation-type ultrasonic wave transmitter/receiver main body 101, in an attempt to enhance the transmitting efficiency of ultrasonic waves, a sound velocity $C_1$ in the propagation medium portion 103 for the ultrasonic wave, a sound velocity $C_2$ in the fluid 104 for the ultrasonic wave, a density $\rho_1$ of the propagation medium portion 103, and a density $\rho_2$ of the fluid 104 are set so as to satisfy the following expression (2):

[Expression 2]

$$(\rho_2/\rho_1) < (C_2/C_1) < 1 \quad (2)$$

Moreover, by using $C_1$, $C_2$, $\rho_1$, and $\rho_2$, $\theta_1$ is set so as to satisfy the following expression (3):

[Expression 3]

$$(\tan \theta_1)^2 = [(\rho_2/\rho_1)^2 - (C_1/C_2)^2]/[(C_1/C_2)^2 - 1] \quad (3)$$

Moreover, there is a relationship indicated by the following expression (4) between $\theta_1$ and $\theta_2$.

[Expression 4]

$$\sin \theta_1/C_1 = \sin \theta_2/C_2 \quad (4)$$

As shown in Patent Document 4, when the above-mentioned expressions (2), (3), and (4) are satisfied, the transmitting efficiency of the ultrasonic wave in the second surface region 112 becomes substantially 1. Consequently, it becomes possible to provide a diagonal propagation-type ultrasonic sensor serving as a diagonal propagation-type ultrasonic wave transmitter/receiver main body 101 that can transmit and receive an ultrasonic wave with high efficiency.

Patent Document 1: JP-A No. 2004-12421
Patent Document 2: JP-A No. 2004-279259
Patent Document 3: WO No. 2004/098234
Patent Document 4: Specification of US. Patent Application Laid-Open No. 2005/0139013
Non-Patent Document 1: "Acoustic Properties of Nanofoam Material and its Applied Ultrasonic Sensors" (HASHIMOTO Masahiko, NAGAHARA Hidetomo, SUGINOUCHI Takehiko), Technical Research Report of The Institute of Electronics, Information and Communication Engineers, issued by Incorporated Company, The Institute of Electronics, Information and Communication Engineers, Vol. 105, No. 619, US2005-127 (P. 29-34)

SUMMARY OF THE INVENTION

Issues to be Solved by the Invention

In the optical microphone disclosed in Patent Document 1, the mechanical resonance characteristic of its diaphragm is greatly influenced by the frequency band in the same manner as in a normal microphone. That is, although it has a comparatively flat frequency characteristic in frequencies lower than the mechanical resonance frequency of the diaphragm, its sensitivity abruptly drops at frequencies above the resonance frequency, with the result that the upper limit as the microphone is limited to the proximity of the resonance frequency. For this reason, the high frequency band characteristic of the currently-used capacitor microphone using a diaphragm is limited to about 100 kHz, and in the case of a characteristic higher than this, a piezoelectric-type device is utilized. Therefore, it is very difficult to form a microphone having a diaphragm whose band characteristic is expanded to 100 kHz or more, with its sensitivity being sufficiently maintained.

Moreover, since the laser Doppler microphone disclosed in Patent Document 2 has no diaphragm, no limitation to a high-frequency band due to mechanical resonance is given thereto. Furthermore, the high-frequency band limitation of vibration measurements in the LDV to be used easily exceeds 1 MHz. Since the change in refractive index relative to a sound pressure of air is small, a very long optical path is required for ensuring sufficient sensitivity. In the example disclosed in Patent Document 2, an optical path length of 10 m or more is required so as to obtain a sufficient S/N value. Therefore, it becomes very difficult to miniaturize the corresponding measuring area. Therefore, in a high-frequency region, a sound wave interference easily occurs in the measuring area, making it difficult to measure an accurate sound pressure. This phenomenon corresponds to mechanical resonance in the case of the diaphragm type device, and is referred to as "cavity resonance". That is, since the high frequency band limitation of the microphone is determined by the dimension of the measuring range, and since the sound velocity in air is slower than the elastic wave velocity of a general-use diaphragm, the high frequency band limitation becomes lower in the case of the laser Doppler microphone when the measuring area and the diaphragm have the same area.

In the conventional optical microphone, although the band width for optical measurements is sufficiently wide, since the high-frequency band is limited by the mechanical resonance or the cavity resonance to be utilized, an issue arises in which it becomes difficult to carry out operations in an ultrahigh-frequency area having, in particular, 100 kHz or more.

Moreover, in the ultrasonic wave transmitter/receiver 101 of Patent Document 3, since no frequency property is exerted in a sound wave to be received by the propagation medium portion 103 formed by a dried silica gel, sound waves can be received in a wide frequency area; however, an ultrasonic vibrator 102 made from a piezoelectric ceramic material or the like is required so as to convert the received sound wave to an electric signal. The acoustic impedance values between the dried silica gel 103 and the piezoelectric ceramic material 102 differ from each other by two digits or three digits so that a sound wave propagated through the dried silica gel 103 and allowed to proceed to the piezoelectric ceramic material 102 is reflected in most portions thereof by the interface (first surface region 111) of the dried silica gel 103 and the piezoelectric ceramic material 102. The sound wave thus reflected is propagated through the dried silica gel 103 in the reversed direction, with the result that, although one portion is released to the air, the rest portions thereof are propagated through the dried silica gel 103, while being repeatedly reflected by the border (the second surface region 112) inside the dried silica gel 103, to cause reverberation.

The reflection phenomenon on the interface (the first surface region 111) between the propagation medium portion 103 and the ultrasonic vibrator 102 is essentially inevitable in the case of the structure in which a substance having different acoustic impedance, such as a piezoelectric ceramic material 102 or the like, is placed inside the propagation medium portion 103 made from the dried silica gel as an element used for conversion into an electric signal. The reverberation due to this reflection is multiplexed on a sound wave signal that arrives later to cause a reduction in an S/N value, and causes an unnecessary resonant phenomenon, raising an issue in which the frequency characteristic deteriorates.

Another issue with the ultrasonic wave transmitter/receiver 101 of Patent Document 3 is low wave-receiving sensitivity. The following description will discuss the reason for this issue.

The energy density of an ultrasonic wave propagated through the fluid 104 is lowered upon receipt by the diagonal propagation-type ultrasonic wave transmitter/receiver main body 101. This is the reason for the lowered wave-receiving sensitivity. Referring to FIG. 12, the reason for the lowered wave-receiving sensitivity will be explained. In FIG. 12, the ultrasonic wave propagating path 105 is indicated by solid lines. As described earlier, in order to allow the diagonal propagation-type ultrasonic wave transmitter/receiver main body 101 to receive an ultrasonic wave with high efficiency, expressions (2), (3), and (4) need to be satisfied. In this case, in the path for the ultrasonic wave propagated through the fluid 104, the angle made by the normal to the second surface region 112 is allowed to satisfy $\theta_2$.

Therefore, in FIG. 12, it is supposed that the ultrasonic wave is propagated through a range of a length ($L_2+L_3+L_4$) of the fluid 104 toward the diagonal propagation-type ultrasonic wave transmitter/receiver main body 101 and that the angle made by the ultrasonic wave propagating path and the normal to the second surface region 112 satisfies $\theta_2$. The length range $L_2$ refers to a range in parallel with the advancing direction 105 of the ultrasonic wave, and means the range in which no ultrasonic wave is allowed to reach the second surface region 112. The range of the length $L_3$ refers to a range that is adjacent to the range of the length $L_2$ and is made in parallel with the advancing direction 105 of the ultrasonic wave, and means the range in which all the ultrasonic waves are allowed to reach the second surface region 112. The range of the length $L_4$ refers to a range that is adjacent to the range of the length $L_3$ and is made in parallel with the advancing direction 105 of the ultrasonic wave, and means the range in which no ultrasonic wave is allowed to reach the second surface region 112.

As shown in FIG. 12, all the ultrasonic waves propagated through the range of the length ($L_2+L_3+L_4$) of the fluid 104 are not received by the diagonal propagation-type ultrasonic wave transmitter/receiver main body 101. The ultrasonic wave propagated through the range of the length $L_3$ has reached the second surface region 112 so that the ultrasonic wave is received by the diagonal propagation-type ultrasonic wave transmitter/receiver main body 101. However, the ultrasonic wave propagated through the range of the length $L_2$ and the range of the length $L_4$ is not allowed to reach the second surface region 112, with the result that the ultrasonic wave is not received by the diagonal propagation-type ultrasonic wave transmitter/receiver main body 101.

That is, one portion of the ultrasonic wave (ultrasonic wave propagated through the range of the length $L_3$) among the portions of the ultrasonic wave (ultrasonic wave propagated through the range of the length $L_2+L_3+L_4$) propagated through the fluid 104 is received by the diagonal propagation-type ultrasonic wave transmitter/receiver main body 101.

The ultrasonic wave that has been propagated through the range of the length $L_3$ of the fluid 104 is allowed to transmit through the second surface region 112, and detected by the ultrasonic vibrator 102 within the range of the length $L_1$. At this time, since $L_3 \ll L_1$ holds, the ultrasonic wave to be received by the diagonal propagation-type ultrasonic wave transmitter/receiver main body 101 is diffused by the second surface region 112, and allowed to reach the ultrasonic vibrator 102. Therefore, when the ultrasonic wave is received by the diagonal propagation-type ultrasonic wave transmitter/receiver main body 101, its energy density is lowered. This reduction of the energy density in the ultrasonic wave causes a reduction in wave-receiving sensitivity of the diagonal propagation-type ultrasonic wave transmitter/receiver main body 101.

Because of the reasons as described above, the wave-receiving sensitivity of the diagonal propagation-type ultrasonic wave transmitter/receiver main body 101 is lowered. That is, since the length $L_3$ of the propagation range of the ultrasonic wave that can be received by the second surface region 112 is smaller than the length $L_1$ of the ultrasonic vibrator 102, the wave-receiving sensitivity of the diagonal propagation-type ultrasonic wave transmitter/receiver main body 101 is lowered.

The present invention has been devised to solve the above-mentioned issues, and its object is to provide an optical ultrasonic microphone that can measure a sound pressure up to an ultrasonic wave range that greatly exceeds the high frequency band limitation of the conventional microphone, and also has high sensitivity.

Means to Solve the Issues

In order to achieve the above-mentioned object, the present invention has the following arrangements.

According to a first aspect of the present invention, there is provided an optical ultrasonic microphone for receiving a sound wave from an ambient space filled with a gas, comprising:

a base that is provided with an opening through which the sound wave is received from the ambient space and an acoustic waveguide for transmitting the sound wave received by the opening, and holds an optical acoustic propagation medium portion that forms at least one portion of the acoustic waveguide and through which the sound wave from the acoustic waveguide and light are propagated;

a light source for applying the light to the optical acoustic propagation medium portion;

a light detecting means for detecting the light emitted from the optical acoustic propagation medium portion and for detecting a modulation of the light caused by the sound wave; and an operation unit for finding a sound pressure from results of the detection by the light detecting means, wherein in this structure, between a density $\rho_a$ and a sound velocity $C_a$ of the gas with which the acoustic waveguide is filled, a density $\rho_n$ and a sound velocity $C_n$ of the optical acoustic propagation medium of the optical acoustic propagation medium portion are allowed to satisfy the following expression:

$$(\rho_a/\rho_n)<(C_n/C_a)<1$$

According to an eighth aspect of the present invention, there is provided an optical ultrasonic microphone, comprising:

an acoustic waveguide member that has a first opening, for defining an acoustic waveguide for propagating a sound wave that is made incident thereon from the first opening in a sound wave propagation direction;

an optical acoustic propagation medium portion that has a transmitting face, and is formed in the acoustic waveguide so as to allow the transmitting face to form one face of the acoustic waveguide in a propagation direction of the sound wave so that the transmitting face is formed in such a manner that one portion of the sound wave is transmitted to the propagation medium portion from the transmitting face, as the sound wave is propagated through the acoustic waveguide, and converged to a converging point;

a light source for applying light to the converging point of the optical acoustic propagation medium portion;

a light detecting means for detecting the light emitted from the optical acoustic propagation medium portion so that a modulation of the light caused by the sound wave that is converged to the converging point is detected; and an operation unit for finding a sound pressure from results of the detection by the light detecting means, the optical acoustic propagation medium portion including a propagation medium with which the gap between the transmitting face and the converging point is filled, and in this structure, the acoustic wave guide is filled with an environmental fluid, and between a density $\rho_a$ and a sound velocity $C_a$ of the environmental fluid with which the acoustic waveguide is filled, a density $\rho_n$ and a sound velocity $C_n$ of the optical acoustic propagation medium of the optical acoustic propagation medium portion are allowed to satisfy the following expression:

$$(\rho_a/\rho_n)<(C_n/C_a)<1$$

and supposing that a length of the acoustic waveguide from the first opening of the acoustic waveguide to an arbitrary point $P_k$ in a propagation direction of the sound wave on the transmitting face is $L_{ak}$ and that a length from the arbitrary point $P_k$ to the converging point is $L_{nk}$, the following relationship is satisfied relative to an arbitrary number k:

$$(L_{ak}/C_a)+(L_{nk}/C_n)=\text{const.}$$

Effects of the Invention

In accordance with the optical ultrasonic microphone of the present invention, the sound wave that is propagated through a gas in the ambient space is received from the opening to the acoustic waveguide, and by measuring the sound wave that proceeds through the inside of the optical acoustic propagation medium from the inside of the acoustic waveguide by the use of light, it becomes possible to carry out measurements up to a high-frequency region that greatly exceeds the limitation of a conventional diaphragm due to its mechanical resonance and the like, and also to carry out a precise sound pressure measurement with high sensitivity, while avoiding influences of reflection of the sound wave caused by a conventional electric acoustic converter made of a piezoelectric ceramic material and the like.

BRIEF DESCRIPTION OF THE DRAWINGS

These and other aspects and features of the present invention will become clear from the following description taken in conjunction with the preferred embodiments thereof with reference to the accompanying drawings, in which:

FIG. 3 is a view that shows one example of an LDV output waveform of the optical ultrasonic microphone in accordance with the first embodiment of the present invention;

FIG. 4 is a view that shows the results of measurements on the isophase wavefront of sound wave propagation of an optical acoustic propagation medium portion of the optical ultrasonic microphone in accordance with the first embodiment of the present invention;

DETAILED DESCRIPTION OF THE INVENTION

Figure 1A:
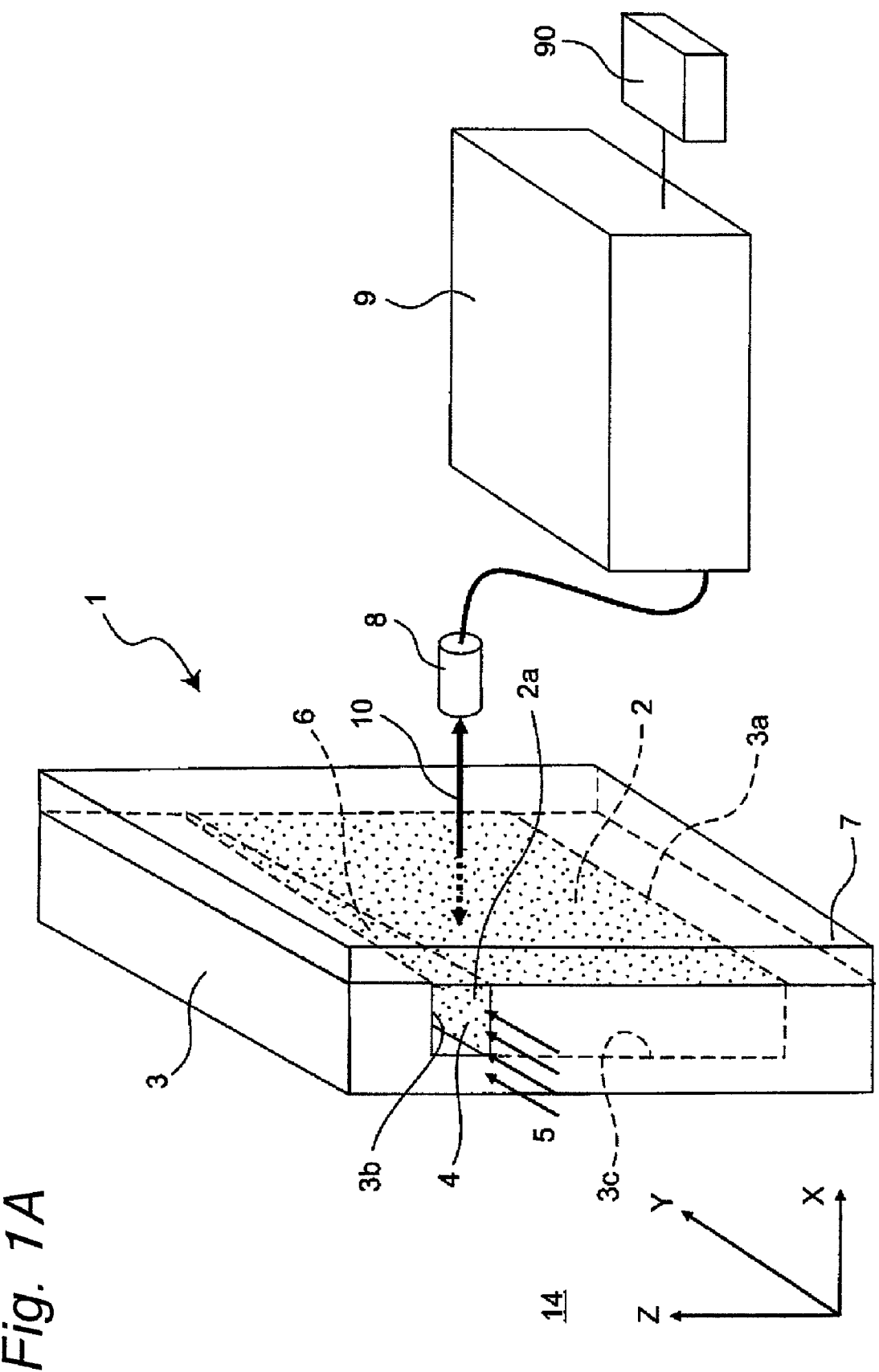
FIG. 1A is a perspective view that shows an optical ultrasonic microphone in accordance with a first embodiment of the present invention.

The present inventors have found that the silica dried gel exerts a characteristic optically close to transparent, and discovered that the rate of change in sound pressure and refractive index of an optical acoustic propagation medium of an optical acoustic propagation medium portion, for example, the silica dried gel, is higher than the rate of change in the air by about single digit. The rate of change in refractive index by a sound pressure becomes greater in the order of a normal solid substance, a liquid, and a gas, and this characteristic is an extremely peculiar characteristic that never appears in a normal bulk material.

The essential point of the present invention resides in that, by utilizing the basic principle of an interface phenomenon of a refraction propagation-type wave-receiver that can propagate an ultrasonic wave from an object that is extremely low in acoustic impedance, such as a gas, to a solid substance with high efficiency, as well as by using a phenomenon that a solid substance that satisfies these conditions generates an extremely great change in refractive index by a sound wave, an optical ultrasonic microphone whose band characteristic can be expanded to an extremely high frequency region is achieved.

Referring to drawings, the following description will discuss embodiments of the present invention.

Prior to detailed explanations of the embodiments of the present invention by reference to drawings, the following description will discuss various aspects of the present invention.

According to a first aspect of the present invention, there is provided an optical ultrasonic microphone, which is a microphone for receiving a sound wave from an ambient space filled with a gas, comprising:

a base, that is provided with an opening through which the sound wave is received from the ambient space and an acoustic waveguide for transmitting the sound wave received by the opening and holds an optical acoustic propagation medium portion which forms at least one portion of the acoustic waveguide and through which the sound wave from the acoustic waveguide and light are propagated;

a light source for applying the light to the optical acoustic propagation medium portion;

a light detecting means for detecting the light emitted from the optical acoustic propagation medium portion and for detecting a modulation of the light caused by the sound wave; and an operation unit for finding a sound pressure from results of the detection by the light detecting means, wherein, between a density $\rho_a$ and a sound velocity $C_a$ of the gas with which the acoustic waveguide is filled, a density $\rho_n$ and a sound velocity $C_n$ of optical acoustic propagation medium of the optical acoustic propagation medium portion are allowed to satisfy the following expression:

$$(\rho_a/\rho_n) < (C_n/C_a) < 1$$

According to a second aspect of the present invention, there is provided the optical ultrasonic microphone according to the first aspect, wherein the optical acoustic propagation medium portion is constructed by a dried gel of an inorganic oxide or an organic polymer.

According to a third aspect of the present invention, there is provided the optical ultrasonic microphone according to the second aspect, wherein the dried gel has physical properties of a density of 100 kg/m$^3$ or more and a sound velocity of 300 m/s or less.

According to a fourth aspect of the present invention, there is provided the optical ultrasonic microphone according to the second or third aspect, wherein the dried gel has a solid skeleton portion that is hydrophobized.

According to a fifth aspect of the present invention, there is provided the optical ultrasonic microphone according to any one of the first to third aspects, wherein the light source is a laser light source.

According to a sixth aspect of the present invention, there is provided the optical ultrasonic microphone according to the fifth aspect, wherein the light detecting means detects a modulation of a frequency of laser light from the laser light source.

According to a seventh aspect of the present invention, there is provided the optical ultrasonic microphone according to the sixth aspect, wherein the light source and the light detecting means are formed by a laser Doppler detecting means so as to be compatibly used.

According to an eighth aspect of the present invention, there is provided an optical ultrasonic microphone comprising:

an acoustic waveguide member that has a first opening, for defining an acoustic waveguide for propagating a sound wave that is made incident thereon from the first opening in a sound wave propagation direction;

an optical acoustic propagation medium portion that has a transmitting face, and is formed in the acoustic waveguide so as to allow the transmitting face to form one face of the acoustic waveguide in a propagation direction of the sound wave so that the transmitting face is formed in such a manner that one portion of the sound wave is transmitted to the propagation medium portion from the transmitting face, as the sound wave is propagated through the acoustic waveguide, and converged to a converging point;

a light source for applying light to the converging point of the optical acoustic propagation medium portion;

a light detecting means for detecting the light emitted from the optical acoustic propagation medium portion so that a modulation of the light caused by the sound wave that is converged to the converging point is detected; and an operation unit for finding a sound pressure from results of the detection by the light detecting means, wherein the optical acoustic propagation medium portion included a propagation medium with which the gap between the transmitting face and the converging point is filled, wherein the acoustic wave guide is filled with an environmental fluid, and between a density $\rho_a$ and a sound velocity $C_a$ of the environmental fluid with which the acoustic waveguide is filled, a density $\rho_n$ and a sound velocity $C_n$ of the optical acoustic propagation medium of the optical acoustic propagation medium portion are allowed to satisfy the following expression:

$$(\rho_a/\rho_n) < (C_n/C_a) < 1$$

and wherein, supposing that a length of the acoustic waveguide from the first opening of the acoustic waveguide to an arbitrary point $P_k$ in a propagation direction of the sound wave on the transmitting face is $L_{ak}$ and that a length from the arbitrary point $P_k$ to the converging point is $L_{nk}$, the following relationship is satisfied relative to an arbitrary number k:

$$(L_{ak}/C_a) + (L_{nk}/C_n) = \text{const.}$$

According to a ninth aspect of the present invention, there is provided the optical ultrasonic microphone according to the eighth aspect, wherein an acoustic horn is connected to a front end of the first opening of the acoustic waveguide.

According to a 10th aspect of the present invention, there is provided the optical ultrasonic microphone according to any one of the first to third, eighth and ninth aspects, wherein the acoustic waveguide has a height and a width that are ½ or less of a wavelength of an ultrasonic wave to be received by the microphone.

According to an 11th aspect of the present invention, there is provided the optical ultrasonic microphone according to any one of the first to third, eighth and ninth aspects, wherein the acoustic waveguide is formed by the base and the optical acoustic propagation medium portion in such a manner that a height of the acoustic waveguide is narrowed toward a terminal side of the acoustic waveguide.

According to a 12th aspect of the present invention, there is provided the optical ultrasonic microphone according to any one of the first to third, eighth and ninth aspects, wherein the ambient gas is air.

According to a 13th aspect of the present invention, there is provided the optical ultrasonic microphone according to any one of the first to third aspects, wherein the light source and the light detecting means are formed by a laser Doppler detecting means so as to be compatibly used, and the laser Doppler detecting means has an optical axis that is disposed in a direction orthogonal to the sound wave propagation direction of the sound wave in which the sound wave proceeds into the optical acoustic propagation medium portion from one face of the optical acoustic propagation medium portion, and the microphone further comprising a mirror, which is placed along the optical axis of the laser Doppler detecting means so as to face the laser Doppler detecting means, with an optical path being formed between the laser Doppler detecting means and the mirror inside the optical acoustic propagation medium portion.

Referring to drawings, the following description will discuss various embodiments of an ultrasonic wave transmitter/receiver in accordance with the present invention.

First Embodiment

Referring to FIGS. 1A to 4, a first embodiment of the present invention will be explained.

Figure 1B:
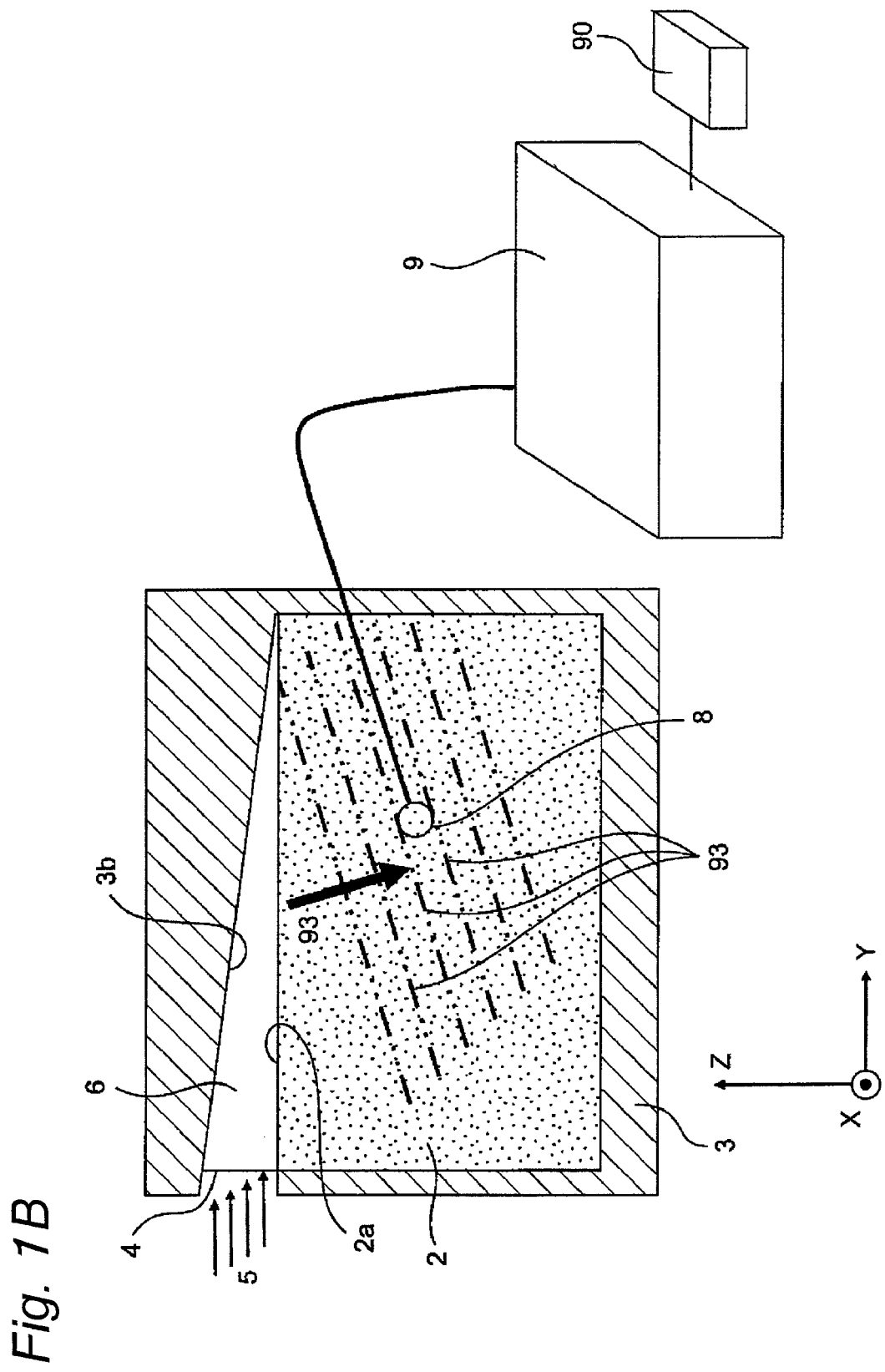
FIG. 1B is a partial cross-sectional front view that shows the optical ultrasonic microphone of the first embodiment of the present invention.

FIGS. 1A and 1B are a perspective view and a partial cross-sectional front view that show a structure of an optical ultrasonic microphone 1 in accordance with the first embodiment. As shown in FIGS. 1A and 1B, suppose that the height direction is defined as a Z-direction, and that two directions that are mutually orthogonal to the height direction are defined as X and Y-directions so that X, Y, and Z-directions are defined. The optical ultrasonic microphone 1 is disposed in the Y-direction, and the thickness direction of the optical ultrasonic microphone 1 corresponds to the X-direction.

In FIGS. 1A and 1B, the optical ultrasonic microphone 1, which is a microphone for receiving sound waves (for example, ultrasonic waves) with respect to the peripheral space of the optical ultrasonic microphone 1 filled with a gas 14 (for example, air), is provided with: a base 3 including an opening portion 4 for receiving the sound waves from the peripheral space, that holds an optical acoustic propagation medium portion 2 that is provided with an acoustic waveguide 6 for transmitting the sound wave received by the opening portion 4 and that forms at least one portion of the acoustic waveguide 6, and an optical acoustic propagation medium for propagating the sound wave from the acoustic waveguide 6 and light; a light source 8 for applying the light (for example, laser light 10) to the optical acoustic propagation medium portion 2; a light detecting means 8 for detecting the light that has been applied from the light source 8 to the inside of the optical acoustic propagation medium portion 2, and emitted from the optical acoustic propagation medium portion 2, so as to detect the modulation of the light due to the sound wave; and an operation unit 9 for finding an output signal for use in sound pressure conversion from the detection results of the light detecting means 8. In this structure, a density $\rho_n$ and a sound velocity $C_n$ of the optical acoustic propagation medium of the optical acoustic propagation medium portion 2 are allowed to satisfy the following expression (6) between the density $\rho_a$ and the sound velocity $C_a$ of the gas with which the acoustic waveguide 6 is filled [in this case, in expression (6), the density $\rho_n$ and the sound velocity $C_n$ of the optical acoustic propagation medium are respectively represented by a density $\rho_{NF}$ and a sound velocity $C_{NF}$.]. In the first embodiment, as an example of the light source and the light detecting means, a laser Doppler vibrometer (hereinafter, referred to simply as "LDV"), which has both of the functions of the light source and the light detecting means, serves as one example of a laser Doppler detecting means, and measures minute, high-speed vibrations by utilizing light typically represented by laser light, is provided so as to be compatibly used as both of the light source and the light detecting means, and an LDV operation unit 9 that serves as one example of the operation unit is provided. In a case where the laser Doppler vibrometer (LDV) is used as examples of the light source and the light detecting means, the light-emitting and light-receiving portion of laser light 10 is separated as an LDV head 8a from the laser light source or a main body unit 8b that has the laser light source or an interference meter so that only the LDV head 8a is allowed to carry out a two-dimensional scanning process on a silica dried gel 2.

Figure 2:
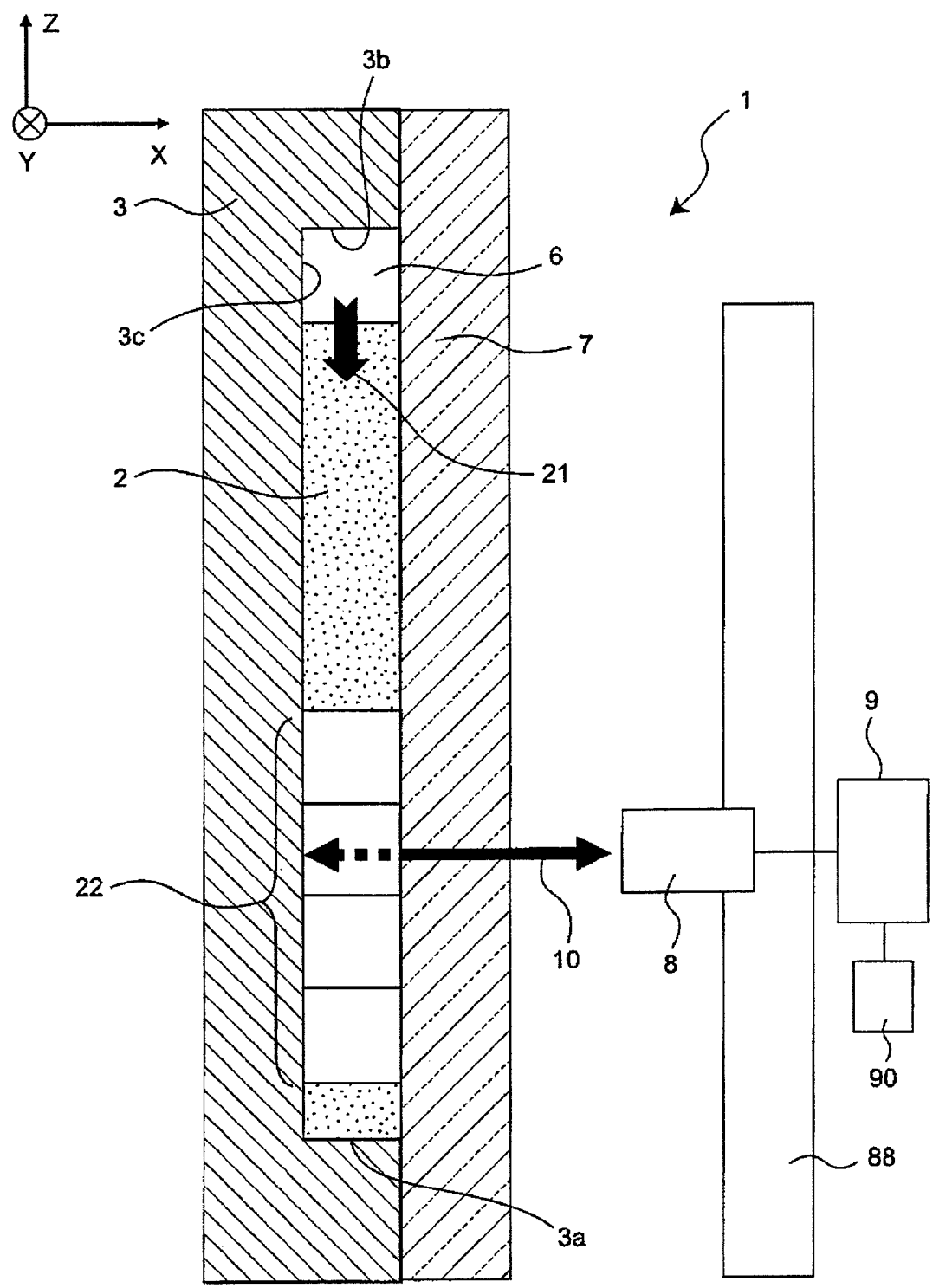
FIG. 2 is an X-Z line cross-sectional view that shows the optical ultrasonic microphone of the first embodiment of the present invention.

The LDV head 8 is allowed to shift two-dimensionally respectively in the Z and Y directions on the Z-Y plane that is the surface of the silica dried gel 2 (strictly speaking, the surface of a transparent supporting plate 7) so as to carry out two-dimensional scanning processes. In order to allow the LDV head 8 to carry out the two-dimensional scanning processes, an LDV head shifting device 88 is installed as shown in FIG. 2. The LDV head shifting device 88 may be formed by using, for example, an XY stage.

In the above-mentioned structure, the acoustic waveguide 6 and the opening portion 4 are constituted by the optical acoustic propagation medium portion 2, the base 3, and the transparent supporting plate 7. The acoustic waveguide 6 is designed so that its dimension in the Z-direction is gradually narrowed toward the terminal portion of the acoustic waveguide 6 in the Y-direction from the opening portion 4. In this case, for example, the dimension (width dimension) in the X-direction of the acoustic waveguide 6 is set to a constant width dimension from the opening portion 4 to the terminal portion; however, for example, instead of the constant width dimension, the width dimension may be gradually narrowed.

More specifically, the optical acoustic propagation medium portion 2 is formed by a flat-plate-shaped member having a rectangular shape with a constant thickness, and is designed to be housed and held inside a concave portion 3a of the base 3.

The base 3 is formed by a substantially plate-shaped member, and has the concave portion 3a having a fixed depth that is allowed to house the optical acoustic propagation medium portion 2 formed on one of the faces thereof. The concave portion 3a is designed to have a trapezoidal shape in its plane shape so that an inner face 3b of the concave portion 3a of the base 3, which forms one portion (upper surface) of the acoustic waveguide 6, is allowed to gradually approach the upper face 2a of the optical acoustic propagation medium portion 2, toward the terminal portion of the acoustic waveguide 6 from the opening portion 4 that is one of the opening end portions of the acoustic wave guide 6, in the Y-direction (longitudinal direction of the acoustic waveguide 6). With this arrangement, the dimension in the Z-direction of the acoustic waveguide 6 is gradually narrowed from the opening portion 4 toward the terminal portion of the acoustic waveguide 6. As shown in FIG. 1A, the right and left side faces of the acoustic waveguide 6 are formed by the bottom face 3c of the concave portion 3a of the base 3 and the inner face of the transparent supporting plate 7, the upper face of the acoustic waveguide 6 is formed by the side face 3b of the concave portion 3a of the base 3, and the lower face of the acoustic waveguide 6 is formed by the upper face 2a of the optical acoustic propagation medium portion 2 so that a substantially rectangular parallelepiped space is formed. Moreover, the bottom face 3c of the concave portion 3a of the base 3 is formed into a mirror surface capable of reflecting light typically represented by laser light. For example, the base 3 may be formed by an aluminum material, or a resin material with a reflective film being formed on the concave portion bottom face 3c. The material for the base 3 may be a normal metal material or a plastic material. Additionally, sound waves to propagate into these members from the optical acoustic propagation medium portion 2 or the acoustic waveguide 6 form such a small degree as to be almost negligible. This is because, in comparison with air or a nano-porous member, the acoustic impedance of these materials is extremely large.

The transparent supporting plate 7 is a transparent, thin plate-shaped member that is superior in translucency, and used for covering at least the entire face of the concave portion 3a of the base 3, preferably, the entire portion of the face on which the concave portion 3a of the base 3 is formed, so that the optical acoustic propagation medium portion 2 to be housed in the concave portion 3a of the base 3 can be supported thereon. Moreover, in addition to its supporting function for the optical acoustic propagation medium portion 2, the transparent supporting plate 7 also allows the laser light 10 applied thereto from the laser Doppler vibrometer for measuring minute, high-speed vibrations by utilizing light typically represented by laser light, that is, from the LDV head 8, to transmit the optical acoustic propagation medium portion 2, and is also designed to form one portion of an optical path for reflected laser light 10 that has transmitted through the optical acoustic propagation medium portion 2 and is reflected by the bottom face (mirror face) 3c of the concave portion 3a of the base 3, and again transmits through the optical acoustic propagation medium portion 2. The transparent supporting plate 7 is formed by using a normal glass material or a resin material such as acrylic resin so that it is possible to obtain a sufficient performance. Additionally, sound waves that proceed from the optical acoustic propagation medium portion 2 or the acoustic waveguide 6 to these members and sound wave leakage that has passed through the transparent supporting plate 7 correspond to such a small degree as to be almost negligible. This is because, in comparison with air or a nano-porous member, the acoustic impedance of these materials is extremely large.

Therefore, as a result that, after the optical acoustic propagation medium portion 2 has been housed in the concave portion 3a of the base 3, the concave portion 3a and the optical acoustic propagation medium portion 2 are secured in a manner so as to be covered with the transparent supporting plate 7, only the opening portion 4 is opened externally, with the other portions of the concave portion 3a of the base 3 being not opened.

In the structures shown in FIGS. 1A and 1B, for example, dried silica gel whose solid skeleton portion has been hydrophobized is used as the material for an optical acoustic propagation medium of the optical acoustic propagation medium portion 2. That is, the optical acoustic propagation medium is constructed by a nano-porous member made of an inorganic oxide or organic polymer, that is, for example, a silica nano-porous member. From the viewpoints of easiness in handling and strength, the thickness of the optical acoustic propagation medium portion 2 is set to at least 1 mm or more. For example, the size is 20 mm×20 mm. As described earlier, by adjusting the manufacturing process, the dried silica gel allows the density of the optical acoustic propagation medium of the optical acoustic propagation medium portion 2 to be set to 100 kg/m$^3$ or more, with the sound velocity inside the optical acoustic propagation medium portion 2 being set to 300 m/s or less. This dried silica gel satisfies the following expression (6), in association with air that is an ambient environmental gas 14.

[Expression 6]

$$(\rho_a/\rho_{NF}) < (C_{NF}/C_a) < 1 \tag{6}$$

In the expression (6), $\rho_a$, $C_a$, $\rho_{NF}$, and $C_{NF}$ respectively represent the density and sound velocity of air as well as the density and sound velocity of the dried silica gel. Patent Document 3 has shown that, under conditions where the expression (6) is satisfied, the border face between the air and the dried silica gel is allowed to provide a refractive angle in which the reflective coefficient is made to 0. That is, this means that there is an angle in which sound wave energy that has reached the border face from air is absorbed in the dried silica gel without any loss.

Moreover, since the solid skeleton portion of the dried silica gel has been hydrophobized, its density is 500 kg/m³ or less. The dried gel corresponds to a nano-porous member dried gel (nano-porous dried gel) having an average pore diameter of 100 nm or less.

Additionally, the solid skeleton portion of the inorganic oxide dried gel preferably includes, at least, silicon oxide (silica) or aluminum oxide (alumina). Moreover, the solid skeleton portion of the organic polymer dried gel may be constructed by a generally-used thermosetting resin or thermoplastic resin. Examples thereof include polyurethane, polyurea, phenolic curable resin, polyacrylic amide, and polymethylmethacrylate.

In a case where the optical acoustic propagation medium portion 2 is made from the nano-porous dried gel, for example, mainly including silica, by setting its density $\rho_1$ to 200 kg/m³, the sound velocity $C_1$ can be set in a range of from about 100 m/s to 180 m/s. In a case where the fluid with which the ambient space is filled is air, since the density $\rho_2$ of air is 1.22 kg/m³ and the sound velocity $C_2$ thereof is 340 m/s, the relationships, $\rho_2 < \rho_1$ and $C_1 < C_2$ can be simultaneously satisfied by adopting the optical acoustic propagation medium portion 2, and the relationship $(\rho_2/\rho_1) < (C_1/C_2)$ can also be satisfied.

In accordance with the above-mentioned structure, the sound wave that has been propagated though air is made incident on the opening portion 4 in the sound-wave propagation direction 5, and subsequently made incident on the acoustic waveguide 6 from the opening portion 4. The sound wave that is being propagated through the acoustic waveguide 6 is allowed to proceed to the silica dried gel forming the optical acoustic propagation medium portion 2 from the top face 2a of the optical acoustic propagation medium portion 2, during the propagation, and is propagated in a sound wave propagation direction 94 (see FIG. 1B). Reference numeral 93 represents an isophase wavefront of the sound wave propagation in a simulated manner. On the other hand, laser light 10 that is projected into the dried silica gel 2 from the LDV head 8 is transmitted through the dried silica gel 2 and reflected by the bottom face 3c of the concave portion 3a of the base 3, and the reflected laser light 10 is again transmitted through the dried silica gel 2, and then emitted from the silica dried gel 2 to be again received by the LDV head 8. At this time, while the laser light 10 is being transmitted through the dried silica gel 2, the laser light 10 is modulated by the sound wave that has proceeded thereto. This modulation of the laser light 10 is caused by a density change and a refractive-index change inside the dried silica gel 2 derived from the propagation of the sound wave in the dried silica gel 2. The laser light 10 that has been projected thereto from the LDV head 8 and is passing through the dried silica gel 2, or the laser light 10 which has been reflected by the bottom face 3c of the concave portion 3a of the base 3 after having once passed through the dried silica gel 2 and is passing through the dried silica gel 2, is finally emitted from the dried silica gel 2, regardless of whether or not it is modulated by the sound wave proceeded to the dried silica gel 2, and again received by the LDV head 8, and demodulated optically as well as electrically by the LDV operation unit 9. The laser light 10, modulated by the sound wave, is demodulated by the LDV operation unit 9 optically as well as electrically, and generated as a modulated signal. This modulated signal is outputted from the LDV operation unit 9 as an LDV measured velocity signal (or an integrated displacement signal) serving as one example of an output signal for use in sound pressure conversion so that, from this output signal, the sound pressure of the sound wave propagated through the inside of the dried silica gel 2 can be converted by a sound pressure conversion operation unit 90 connected to the LDV operation unit 9.

In this case, the sound wave forms a substantially complete progressive wave at the sound-wave measuring point by the laser light 10 inside the dried silica gel 2. Moreover, in the case of a laser output in the level of a normal LDV head, influences to the sound wave by the laser light can be ignored. Moreover, in the optical ultrasonic microphone 1 in accordance with the present first embodiment, since, different from the conventional microphone or ultrasonic sensor, no electromechanical conversion mechanism, such as a diaphragm or a piezoelectric element, is required so that none of reverberation, unnecessary resonance, and the like, due to a sound-wave reflecting phenomenon caused by these electromechanical conversion mechanisms, are given; therefore, the above-mentioned optical ultrasonic microphone 1 makes it possible to measure the sound wave that is highly faithful to the original sound. Moreover, in the above-mentioned optical ultrasonic microphone 1, since no structural restriction is given to the portions after the measuring point, a sound-wave absorption mechanism or a sound-wave scattering mechanism may be formed at the end portion of the optical acoustic propagation medium portion 2 after the measuring portion so that unnecessary sound-wave propagation inside the optical acoustic propagation medium portion 2 can be suppressed.

FIG. 2 is a cross-sectional view taken in X-Z direction of the optical ultrasonic microphone in the first embodiment of the present invention. Referring to FIG. 2, the following description will discuss a principle of sound pressure measurements of the present invention. In FIG. 2, suppose that, in the acoustic waveguide 6, an acoustic plane wave is propagated in the direction from the front surface side to the rear surface side of the drawing paper of FIG. 2. The acoustic plane wave has its one portion taken into the dried silica gel that corresponds to the optical acoustic propagation medium portion 2, and this portion is propagated in a sound-wave propagation direction (corresponding to only the downward component in a sound-wave propagation direction 94). For simplicity of explanation, the sound-wave propagation direction 21 is indicated as a downward direction; however, actually, this component also has components of air and the dried silica gel 2 that proceed toward the rear side of the drawing paper of FIG. 2.

In this case, the sound wave that is propagated through the dried silica gel 2 is indicated by thick portions and thin portions as wave fluxes 22 on pulses. The black portions of the wave fluxes 22 correspond to portions having a sound pressure of 0, and the white portions correspond to portions having a peak of the sound pressure (including positive and negative peaks). In the white portions of the wave fluxes 22, the volume V of the dried silica gel 2 is expanded and contracted by the sound pressure, that is, a volume change $\Delta V$ is generated. The refractive index n of the dried silica gel 2 is changed by $\Delta n$ by the volume change $\Delta V$. This relationship is indicated by the following expression (7).

[Expression 7]

$$\Delta V/V = -(\Delta n/(n-1)) \quad (7)$$

In the first embodiment of the present invention, as described earlier, the sound wave is propagated inside the dried silica gel 2 as an acoustic plane wave. Therefore, since the volume change $\Delta V$ is limited only to the displacement in the progressing direction of the sound wave, the following expression (8) holds:

[Expression 8]

$$\Delta V/V = \Delta l/l = S \quad (8)$$

In this expression, l represents the length in the sound-wave propagation direction in the dried silica gel 2 caused by the sound wave, $\Delta l$ is a placement in the sound-wave propagation direction in the dried silica gel 2 caused by the sound wave, and S represents a strain in the dried silica gel 2 in the sound-wave propagation direction. The sound pressure P inside the dried silica gel 2 is represented by the following expression (9) by using the strain S and an elastic constant $E_{NF}$ of the dried silica gel 2:

[Expression 9]

$$P = -S \times E_{NF} \quad (9)$$

Moreover, the elastic constant $E_{NF}$ is found from the density $\rho_{NF}$ and the sound velocity $C_{NF}$ of the dried silica gel 2 by using the following expression (10):

[Expression 10]

$$E_{NF} = C_{NF}^2 \times \rho_{NF} \quad (10)$$

In accordance with expressions (6) to (10), the sound pressure P inside the dried silica gel 2 is represented by the following expression (11), by using the density $\rho_{NF}$, the sound velocity $C_{NF}$, the refractive index n, and the change in the refractive index $\Delta n$ of the dried silica gel 2, as well as the distance L in which the sound wave and the laser light 10 interfere with each other, a displacement output $\Delta L$ of the LDV head 8 for use in the measurements, or an velocity output v.

[Expression 11]

$$\begin{aligned} \therefore P &= -C_{NF}^2 \times \rho_{NF} \times \frac{\Delta n}{n-1} \quad (\because \Delta n \cdot L = n \cdot \Delta L) \\ &= -C_{NF}^2 \times \rho_{NF} \times \frac{n}{n-1} \frac{\Delta L}{L} \\ &= -C_{NF}^2 \times \rho_{NF} \times \frac{n}{n-1} \frac{1}{L} \int v \, dt \end{aligned} \quad (11)$$

Therefore, the sound pressure P can be measured by using the velocity output v or the displacement output $\Delta L$ to be outputted.

In one working example of the first embodiment, the dried silica gel 2 is set to have a density of 160 kg/m³ and a sound velocity of 90 m/s. This has a refractive index n=1.07. Based upon the theory disclosed by Patent Document 3, the reflectance becomes 0 in the case of an incident angle of 89.5 degrees from air, with the refractive angle at this time being set to about 16 degrees. As described earlier, since the incident angle from air is substantially in parallel with the border interface, the acoustic plane wave having the same sound pressure value as a sound pressure value possessed by the acoustic plane wave is propagated through the inside of the dried silica gel 2, when an acoustic plane wave is propagated through the acoustic waveguide 6. In the acoustic waveguide 6 in the first embodiment, the height is made to become gradually lower (the dimension in the z-direction becomes gradually smaller) as the distance from the opening portion 4 becomes longer (toward the terminal portion from the opening portion 4). With this effect, it is possible to provide a structure in which, even when acoustic energy is taken into the dried silica gel 2, no reduction in the sound pressure is caused inside the acoustic waveguide 6 so that an acoustic plane wave having a uniform sound pressure is propagated inside the dried silica gel 2.

The following description will discuss the results of proving the principle by using sound waves of 100 kHz or less in association with the principle evaluation system. The results, shown here, have been obtained in a case where a driving signal having one wavelength with a center frequency of 40 kHz is radiated from a wide-band tweeter as a measuring sound wave. By taking the center frequency of 40 kHz into consideration, each of the width and the initial height (height at the opening portion 4) of the acoustic waveguide 6 was set to 4 mm. The thickness of the dried silica gel serving as one example of the optical acoustic propagation medium portion 2 was also set to 4 mm. A laser Doppler vibrometer (LDV head 8) of a heterodyne system using an He—Ne laser with a wavelength of 633 nm was used for measuring laser light 10 that reciprocatingly propagates through the dried silica gel 2, as one example of the light source and the light detecting means. The modulation of light by the sound wave corresponded to a frequency modulation. An aluminum material was used as the base 3, and an acrylic resin plate with a thickness of 1 mm was used as the transparent supporting plate 7. Laser light 10 projected from the He—Ne laser was made incident on the dried silica gel 2 after having passed through the acrylic resin plate of the transparent supporting plate 7, and was then reflected by the bottom face 3c of the concave portion 3a of the base 3, and returned to the LDV head 8 after having been reversely propagated through the optical path. Therefore, the optical path for use in measuring the sound wave is set to 8 mm that is two times larger than the thickness 4 mm of the dried silica gel 2.

FIG. 3 shows one example of an LDV output waveform 31 (waveform measured by a displacement amplitude measuring device) of the optical ultrasonic microphone 1 in accordance with the first embodiment of the present invention. This waveform is obtained at the position of Y=8 mm and Z=3 mm in FIG. 4. FIG. 3 indicates that the transmission sound pressure from the tweeter is reproduced faithfully so that it is possible to measure a sound pressure with a very wide band. That is, the first embodiment of the present invention makes it possible to receive an ultrasonic wave in a high frequency range with a wide band that has been difficult to receive by using a conventional technique, and consequently to achieve a standard microphone having an effective band of 100 kHz or more.

FIG. 4 shows a state of isophase wavefront 42 of propagated sound waves based upon the results of measured propagation time on sound wave propagations inside a dried silica gel 2 obtained by two-dimensional scanning processes by the LDV head 8. It is observed that the sound wave propagation direction 41 is substantially coincident with a designed value so that the propagation is carried out through the dried silica gel 2 as a plane wave with a refractive angle of about 16 degrees; thus, operations as theoretically designed can be confirmed.

The waveform 31 of FIG. 3 shows that a peak displacement is about 22 nm. The sound pressure P converted from expression (11) is about 54.5 Pa that is slightly higher than 38 Pa that is the input conversion sound pressure. These are caused by the diffraction effect between the optical ultrasonic microphone 1 and the standard microphone that has been used for the sound pressure calibration. The sound pressure to be measured and converted and the aforementioned input conversion sound pressure are sufficiently coincident with each other from the viewpoint of order, and by appropriately calibrating the sound pressure to be measured and converted, a sound pressure measuring process with high precision can be carried out. The rate of change in the refractive index per 1 Pa of sound pressure is about $5.4 \times 10^{-8}$, which is larger than the rate of change in the refractive index in air ($2.0 \times 10^{-9}$) or the rate of change in the refractive index in water ($1.5 \times 10^{-10}$) by one digit or more. By utilizing this large rate of change in the refractive index, it becomes possible to carry out a sound pressure measurement by using an extremely short optical path of 8 mm with respect to the optical path length for sound-wave measurements.

Additionally, in this embodiment, the dried silica gel 2 is used as one example of the optical acoustic propagation medium portion; however, on principle, any dried organic gel may be used as long as it satisfies the expression (6). In this case, it is necessary to select and use an LDV head 8 having a wavelength band with less absorption. Moreover, as the transparent supporting plate 7, any plate may be used as long as it exerts less absorption on laser light 10 to be used, and in a case where the optical acoustic propagation medium portion 2 is sufficiently held by the structure of the base 3 or the like, no transparent supporting plate 7 is required.

Second Embodiment

Figure 5A:
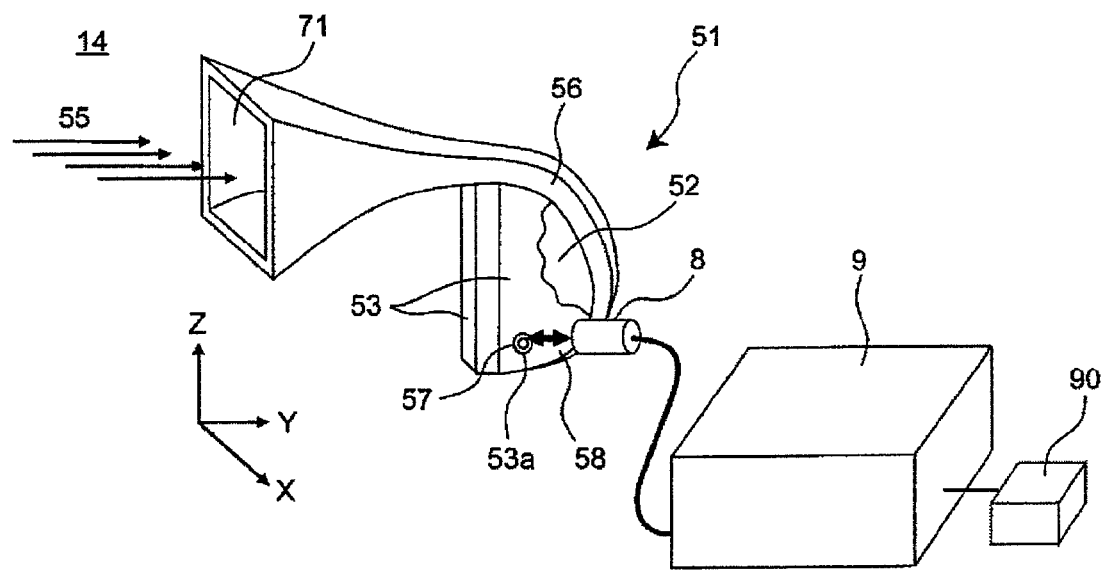
FIG. 5A is a perspective view of an optical ultrasonic microphone in accordance with a second embodiment of the present invention.

FIG. 5A is a perspective view that shows a structure of an optical ultrasonic microphone 51 in accordance with a second embodiment of the present invention. Hereinafter, those components that have the same functions and shapes as those of the first embodiment are indicated by the same reference numerals.

In FIG. 5A as well, reference numeral 51 represents an optical ultrasonic microphone, 52 represents an optical acoustic propagation medium portion that has the same functions as the optical acoustic propagation medium portion 2 of the first embodiment, and is constructed by a dried silica gel that is one example of the optical acoustic propagation medium, 53 represents a base that has the same functions as the base 3 of the first embodiment, 71 represents an opening of an acoustic horn (converging unit), 55 represents a sound wave propagation direction of a sound wave (for example, ultrasonic sound wave), 56 represents an acoustic waveguide member used for forming an acoustic waveguide 60 that has the same functions as the acoustic waveguide 6 of the first embodiment, 57 represents a converging point of the sound wave in the dried silica gel 52, and 58 represents laser light that is the same as the laser light 10 of the first embodiment.

The optical ultrasonic microphone 51 of the second embodiment as shown in FIG. 5A is characterized in that it has an acoustic horn and its opening 71 and that the shapes of the dried silica gel 52 and the acoustic waveguide 60 have curved-line shapes. In FIG. 5A, for convenience of understanding, one portion of the base 53 located on the surface side of the dried silica gel 52 is exploded so that the dried silica gel 52 is illustrated in an exposed state; however, actually, all the surface of the dried silica gel 52 is covered with the base 53 except for a measuring through hole 53a, which will be described later. In other words, by supporting the front surface and the rear surface as well as the left-side face and the bottom face of the dried silica gel 52 of FIG. 5A by using the base 53, with the rest right-side face being covered with an acoustic waveguide member 56, so as to form one portion of the acoustic waveguide 60, the dried silica gel 56 is sufficiently held by the base 53 and the acoustic waveguide member 56 so that no transparent supporting member corresponding to the transparent supporting plate 7 of the first embodiment is required. For convenience of explanation, only the path in the air of the laser light 58 is described. The same LDV head 8 and LDV operation unit 9 as those of the first embodiment are used.

In the optical ultrasonic microphone 51 of the second embodiment of the present invention, by propagating the sound wave from an environmental fluid 14 having an extremely small acoustic impedance, such as a gas, to a solid substance with high efficiency, the sound wave transmitted to the solid substance is converged in the inside of the solid substance, and the energy density of the sound wave is consequently enhanced so that it becomes possible to receive the sound wave with high sensitivity.

The sound wave propagated though the environmental fluid is made incident on the opening portion 71 of the conversing unit 77 serving as an acoustic horn connected to the tip of the acoustic waveguide member 56 so that the sound pressure of the sound wave is enhanced by the conversing unit 77. The sound wave whose sound pressure has been enhanced by the converging unit 77 is directed to the acoustic waveguide 60 of the acoustic waveguide member 56 connected to the converging unit 77. The acoustic waveguide 60 propagates the sound wave in a predetermined direction. The dried silica gel 52 serving as one example of the optical acoustic propagation medium portion is placed adjacent to the acoustic waveguide member 56 so as to form one portion of the acoustic waveguide 60 so that the sound wave is transmitted to the optical acoustic propagation unit 52 little by little from the interface made in contact with the acoustic waveguide 60, as the sound wave is propagated through the acoustic waveguide 60. At this time, the propagation direction of the sound wave is refracted on the interface.

Since the sound wave to be transmitted into the optical acoustic propagation medium portion 52 is made incident onto the propagation medium portion 52 so as to be converged to the converging point 57 corresponding to the position where the LDV head 8 is placed, the LDV head 8 detects the sound wave that has been transmitted into the optical acoustic propagation medium portion 52 little by little, and converged onto the converging point 57, by utilizing laser light 58 in the same manner as in the first embodiment. The base 53 is formed so as to hold the propagation medium portion 52. Actually, other bases 53 are also formed on the front side and the rear side in the X-direction of the optical acoustic propagation medium portion 52; however, in FIG. 5A, these are not given so as to clearly show the optical acoustic propagation medium portion 52.

The following description will discuss structures of the respective portions in detail.

Figure 5B:
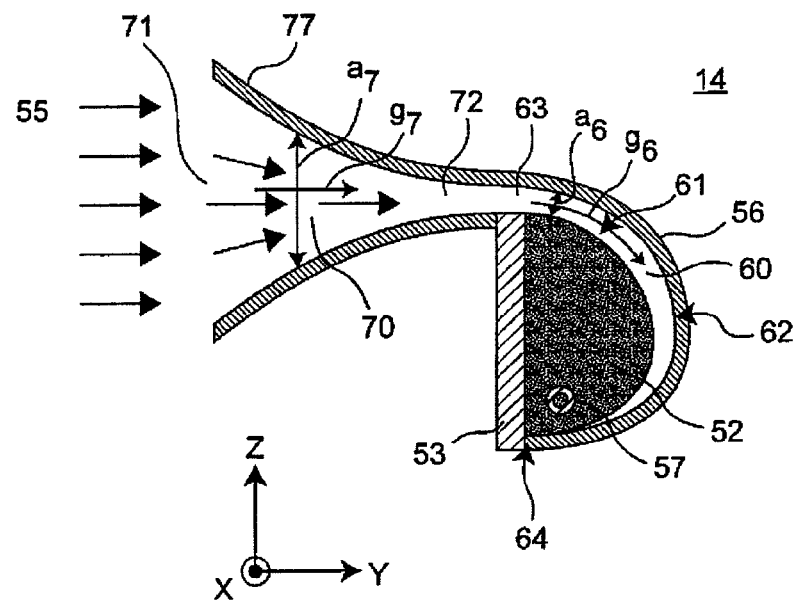
FIG. 5B is a cross-sectional view of the optical ultrasonic microphone shown in FIG. 5A.

FIG. 5B is a cross-sectional view that shows one portion of the optical ultrasonic microphone 51 shown in FIG. 5A, taken in the X-direction in the center of the converging unit 77 and the acoustic waveguide member 56 along a plane in parallel with the YZ-plane.

The converging unit 77 is an acoustic horn that defines an inner space 70 having an end portion 72 that is connected to the opening (first opening) 63 of the acoustic waveguide 56 and an opening (second opening) 71. The opening 71 is made larger than the opening 63. A sound wave made incident on the opening 71 in the sound-wave propagation direction 55 is controlled in its propagation direction by the inner space 70, and also compressed. For this reason, the inner space 70 is made so as to be gradually narrowed in its cross-sectional area $a_7$ perpendicular to the propagation direction $g_7$ in a propagation direction $g_7$ along which the sound wave from the opening 71 is propagated.

More preferably, the inside face of the converging unit 77 that defines the inner space 70 is designed so as to have a curved-face shape along the propagation direction $g_7$ so that the cross-sectional area $a_7$ is reduced in a manner indicated by an exponential function relative to the propagation direction $g_7$ from the opening 71 toward the opening 63 of the acoustic waveguide 60. The width dimension in the X-direction of the converging unit 77 may be constant, or the width dimension may be gradually narrowed. In a case where the width dimension in the X-direction of the converging unit 77 is constant, the width dimension in the Z-direction is preferably designed to be reduced in a manner indicated by an exponential function relative to the propagation direction $g_7$. Moreover, by reducing the width dimension in the X-direction and the width dimension in the Z-direction of the converging unit 77 in proportion to $\sqrt{e}$ to the propagation direction $g_7$, the cross-sectional area $a_7$ may be reduced in a manner indicated by an exponential function. By reducing the cross-sectional area $a_7$ exponentially, the reflection of the sound wave in the converging unit 77 can be reduced to the minimum so that the sound wave can be compressed without disturbance in the phase to increase the sound pressure.

The converging unit 77 has, for example, a length of 100 mm in the Y-direction, and the opening 71 has a square shape, each side having a length of 50 mm in the Z-direction as well as in the X-direction. Moreover, the end portion 72 has a square shape, each side having a length of 2 mm in the X-direction as well as in the Z-direction. In the second embodiment, the lengths are changed in the two directions of the Z-direction and the X-direction. Supposing that the position of the horn opening 71 is set to the origin (0) in the Y-direction, the lengths in the X-direction and the Z-direction in the inner space 70 at respective positions from the origin in the Y-direction: 0 mm/20 mm/40 mm/60 mm/80 mm/100 mm (the length in the X-direction and the length in the Z-direction are the same at the respective positions), are given as 50.0 mm/26.3 mm/13.8 mm/7.2 mm/3.8 mm/2.0 mm.

In accordance with the converging unit 77 having the above-mentioned sizes, it is possible to obtain an effect of a sound pressure rise of a sound wave corresponding to about 10 dB, in comparison with the case without the converging portion 77. Moreover, as the results of measurements at the opening 71 and the end portion 72, the shape of the sound pressure waveform corresponding to the sound pressure in change with time has hardly any change to show, so that the sound wave energy is compressed at the end portion 72 without causing disturbance in the sound wave propagated through the environmental fluid (for example, air) 14.

The converging portion 77 can be formed by mechanically machining an aluminum plate, for example, a metal plate with a thickness of 5 mm, into a predetermined shape. Any material other than aluminum may be used for forming the converging portion 77, as long as the material hardly transmits a sound wave propagated through the inner space 70 and can enhance the density of the sound wave energy by the effect of its shape. For example, the converging unit 77 may be formed by using a material, such as resin or ceramics. Moreover, the converging unit 77 is not necessarily designed to have an outer shape of the horn type, as long as its inner space 70 has a horn shape as described above.

The acoustic waveguide member 56 defines the acoustic waveguide 60 for propagating a sound wave in a predetermined direction. In the second embodiment, as shown in FIG. 5B, the waveguide 60 has a curve in its propagation direction $g_6$ on the Z-Y plane, and the width dimension on the Z-Y plane is also changed depending on positions. The propagation direction $g_6$ is kept in parallel with the Z-Y plane. The width dimension in the X-direction of the waveguide 60 is also constant, and, for example, set to 2 mm. However, the width dimension in the X-direction may also be designed so as to be changed.

The acoustic waveguide 60 includes a transmitting face 61 that is made in contact with the optical acoustic propagation medium portion 52, and defined by an interface with the optical acoustic propagation medium portion 52, and a waveguide outer face 62 that is defined by the acoustic waveguide member 56. Moreover, the front side and the rear side in the X-direction of the waveguide 60 are also defined by the acoustic waveguide member 56.

As will be explained below in detail, as a sound wave is propagated through the waveguide 60, one portion of the sound wave is transmitted from the transmitting face 61 to the optical acoustic propagation medium portion 52, with the result that the energy of the sound wave to be propagated through the waveguide 60 is reduced. For this reason, in order to compress the sound wave so as to compensate for the reduction of the energy, the cross-sectional area of the waveguide 60 is made smaller. More specifically, the transmitting face 61 and the waveguide outer face 62 are designed to allow the width perpendicular to the propagation direction $g_6$ on the Y-Z plane to monotonously decrease relative to the propagation direction, and the waveguide 60 is closed at a waveguide terminal 64. With this arrangement, the sound wave can be efficiently refracted and transmitted toward the propagation medium portion 52, with the energy density of the sound wave to be propagated through the waveguide 60 being kept constant.

As described earlier, the transmitting face 61 is defined by the optical acoustic propagation medium portion 52 so that the transmitting face 61 forms a transmitting face through which a sound wave is transmitted to the optical acoustic propagation medium portion 52. The optical acoustic propagation medium portion 52 is characterized in that its propagating speed of the sound wave is slower than that of the environmental fluid 14, and is constructed by a propagation medium. That is, supposing that the sound velocities of a sound wave in the propagation medium and the environmental fluid 14 are $C_n$ and $C_a$, the following expression (12) is satisfied:

[Expression 12]

$$(C_n/C_a) < 1 \tag{12}$$

Examples of this propagation medium include dried gels of an inorganic oxide compound or an organic polymer. A dried silica gel is preferably used as the dried gel of the inorganic oxide compound. The dried silica gel is obtained by, for example, the following method.

First, a solution is prepared by mixing tetraethoxysilane (hereinafter, referred to simply as TEOS), ethanol, and aqueous ammonia, and by gelling these, a wet gel is produced. The wet gel refers to a material kept in a state in which pores in a dried gel are filled with a liquid. The liquid portions of this wet gel are substituted with liquefied carbon dioxide gas, and removed by a super critical drying method by using carbon dioxide gas so that a dried silica gel is obtained. The density of the dried silica gel can be adjusted by changing the mixed ratio of TEOS, ethanol, and aqueous ammonia, and the sound velocity changes in response to the density.

The dried silica gel is a material having a fine porous structure of silicon oxide, and its skeleton portion is hydrophobized. The size of the pores and skeleton portions is about several nms. In a case where, from such a structure with the pore portions being filled with a liquid, the solvent is directly dried, a great force is exerted by the capillarity when the solvent is evaporated, with the result that the structure of the skeleton portions tends to be damaged. By using the super critical drying method without causing surface tension so as to prevent this damage, the dried gel body can be obtained without damaging the silica skeleton portions.

As will be described below in detail, the propagation medium of the optical acoustic propagation medium portion 52 is more preferably allowed to satisfy the following conditional expression (13), supposing that the densities of the propagation medium and the environmental fluid 14 are respectively defined as $\rho_n$ and $\rho_a$:

[Expression 13]

$$(\rho_a/\rho_n) < (C_n/C_a) < 1 \tag{13}$$

The propagation medium of the optical acoustic propagation medium portion 52 more preferably has a density $\rho_n$ of 100 kg/m$^3$ or more and a sound velocity $C_n$ of 300 m/s or less.

The density $\rho_n$ and the sound velocity $C_n$ of the dried silica gel forming the optical acoustic propagation medium portion 52 to be used in the second embodiment are respectively set to 200 kg/m$^3$ and 150 m/s. These values provide materials that satisfy the refractive propagation phenomenon shown in Patent Document 1. Additionally, the density $\rho_a$ and the sound velocity $C_a$ of air are respectively 1.12 kg/m$^3$ and 340 m/s at about room temperature.

Moreover, since the optical acoustic propagation medium portion 52 has a function for propagating a sound wave received from the environmental fluid 14 to the converging point 57 so that, when the inner loss is high, the sound wave to reach the converging point 57 is weakened. For this reason, the optical acoustic propagation medium portion 52 is preferably made from a material having less inner loss. The dried silica gel is a material that is capable of satisfying the above-mentioned conditions of the sound velocity and density, and has little inner loss.

Since this dried silica gel has a low density, it is also low in the mechanical strength. For this reason, it is difficult to handle this. In the present second embodiment also, the base 53 is prepared so as to support the optical acoustic propagation medium portion 52.

Figure 5C:
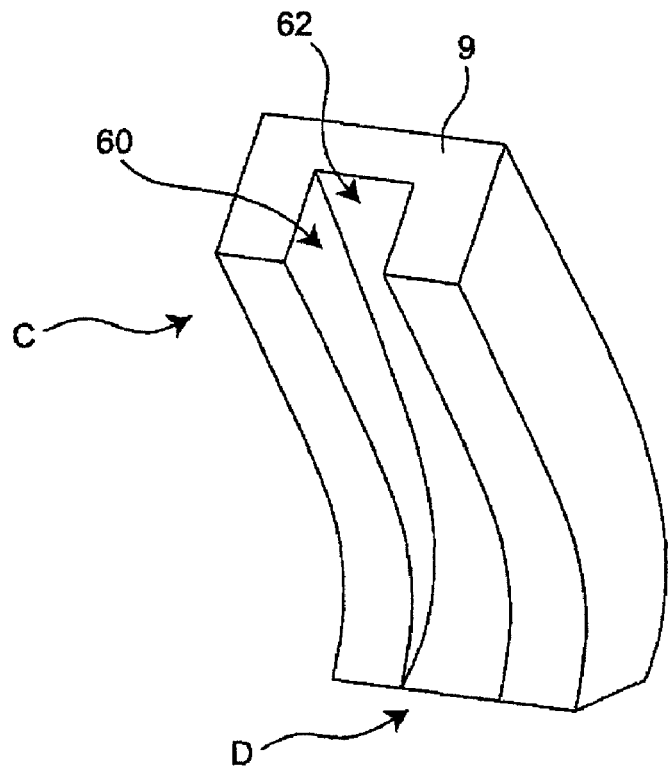
FIG. 5C is a perspective view that shows one portion of a base of the optical ultrasonic microphone shown in FIG. 5A.
Figure 5D:
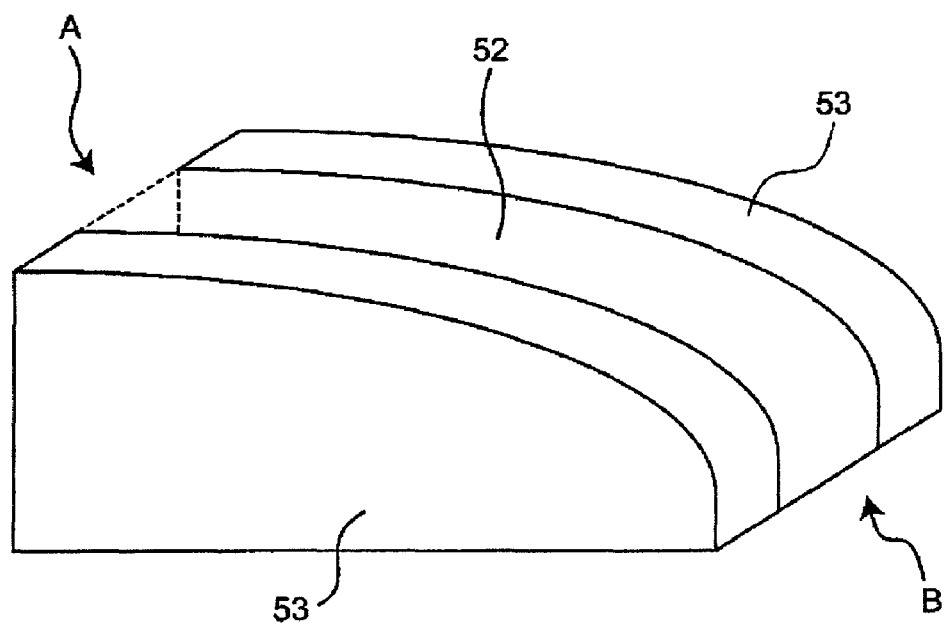
FIG. 5D is a perspective view that shows one portion of an acoustic waveguide member of the optical ultrasonic microphone shown in FIG. 5A.

The acoustic waveguide member 56 and the base 53 can be formed, for example, by using shapes shown in FIGS. 5C and 5D. As shown in FIG. 5C, the acoustic waveguide member 56 for defining the waveguide 60 including the waveguide outer face 62 is formed by using an aluminum member.

As shown in FIG. 5D, the base 53 for holding the optical acoustic propagation medium portion 52 is prepared. The exposed face of the optical acoustic propagation medium portion 52 held by the base 53 is allowed to define the transmitting face 61. For example, the base 53 made of a porous ceramic material is first formed, and the base 53 is fitted into a mold whose face used for defining the transmitting face 61 made of a fluorine-based resin or the like, and a wet gel is introduced into the space. Thereafter, the liquid portions are substituted with a liquefied carbon dioxide gas, and dried so that a member is obtained in which the optical acoustic propagation medium portion 52 and the base 53 are integrally formed.

As shown in FIG. 5D, the two ends A and B of the base 53 holding the optical acoustic propagation medium portion 52 and the two ends C and D of the acoustic waveguide member 56, shown in FIG. 5C are made coincident with one another, and joined to one another by using an adhesive such as an epoxy resin so that a waveguide 60 whose transmitting face 61 is defined by the optical acoustic propagation medium portion 52 can be formed.

Next, the following description will discuss geometrical shapes of the waveguide 60 defined by the acoustic waveguide member 56 and the optical acoustic propagation medium portion 52, as well as a propagating process of a sound wave, in detail.

Figure 5E:
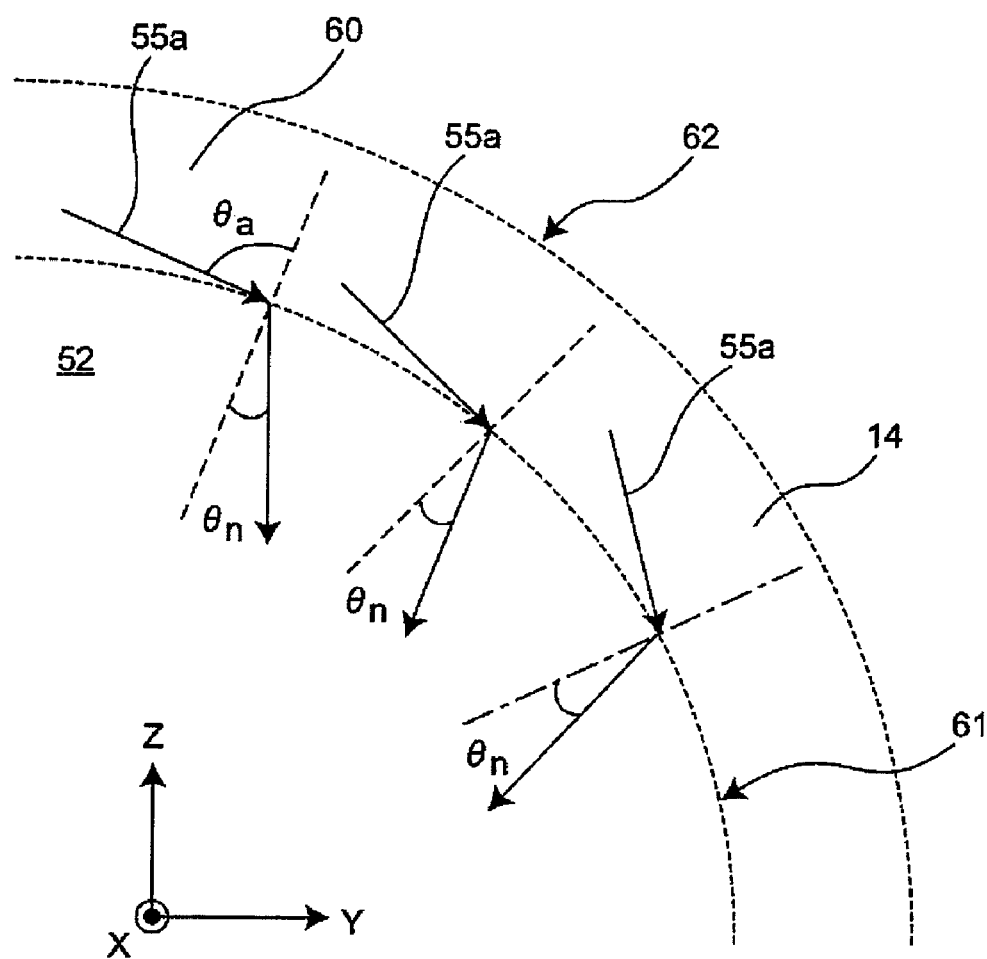
FIG. 5E is a view that explains propagation/refraction of a sound wave in the optical ultrasonic microphone shown in FIG. 5A.

FIG. 5E shows one portion of the waveguide 60 in an expanded manner. In FIG. 5E, the transmitting face 61 and the waveguide outer face 62 are indicated by dotted lines, and a perpendicular to a tangent on an arbitrary point on the transmitting face 61 is indicated by a dashed line. Moreover, the propagation direction of the sound wave is indicated by an arrow 55a.

As shown in FIG. 5E, a sound wave that proceeds through the waveguide 60 is propagated in the environmental fluid 14 with which the waveguide 60 is filled, with its advancing direction being changed in accordance with the shape of the waveguide 60. Among components of this, a sound wave component to be made in contact with the transmitting face 61 that forms an interface between the waveguide 60 and the optical acoustic propagation medium portion 52 is made incident on the transmitting face 61 with an angle $\theta_a$ relative to the normal to the transmitting face 61 so that the sound wave component is refracted and transmitted through the optical acoustic propagation medium portion 52, with a constant angle $\theta_n$ relative to the normal to the transmitting face 61, in a manner so as to satisfy Snell's law.

The angle $\theta_n$ in the propagation direction of the sound wave inside the optical acoustic propagation medium portion 52 is indicated by the following expression (14). In this case, when the relationship of the aforementioned expression (12) is satisfied, the angle $\theta_n$ found by the expression (14) forms a positive value so that the sound wave is refracted and transmitted through the optical acoustic propagation medium portion 52.

[Expression 14]

$$\theta_n = \tan^{-1} \sqrt{\frac{(\rho_n/\rho_a)^2 - (C_a/C_n)^2}{(C_a/C_n)^2 - 1}} \tag{14}$$

In expression (14), $\rho_a$ and $C_a$ respectively represent the density and sound velocity of the environmental fluid, and $\rho_n$ and $C_n$ respectively represent the density and sound velocity of the propagation medium of the optical acoustic propagation medium portion 52. The respective values are the same as those described above.

On the other hand, the reflectance R on the interface between the waveguide 60 and the optical acoustic propagation medium portion 52 is represented by the following expression (15):

[Expression 15]

$$R = \frac{\frac{\rho_n}{\rho_a} - \frac{\tan\theta_a}{\tan\theta_n}}{\frac{\rho_n}{\rho_a} + \frac{\tan\theta_a}{\tan\theta_n}} \quad (15)$$

In order to allow the sound wave to be refracted and transmitted from the acoustic waveguide 60 to the optical acoustic propagation medium portion 52 with efficiency as high as possible, the reflectance R is preferably made as small as possible. In a case where $C_n$, $C_a$, $\rho_n$, and $\rho_a$ satisfy the aforementioned expression (13), there are surely angles $\theta_a$ and $\theta_n$ that make the numerator of expression (15) zero. That is, the reflectance R becomes zero.

In the second embodiment, the environmental fluid 14 and the optical acoustic propagation medium portion 52 are the above-mentioned air and dried silica gel, and $\rho_a$, $C_a$, $\rho_n$, and $C_n$ have the above-mentioned values. When these values are substituted into expression (14), the angle $\theta_n$ is set to about 26 degrees. In this case, when the angle $\theta_a$ is about 89 degrees, the reflectance R becomes substantially zero. Therefore, under the conditions of the present second embodiment, by allowing the sound wave to be made incident on the transmitting face 61 at about 89 degrees relative to the normal to the transmitting face 61, the sound wave is allowed to transmit in a direction of the angle $\theta_n$ being set to about 26 degrees, into the optical acoustic propagation medium portion 52, with high transmitting efficiency.

The refraction angle $\theta_n$ in a case where the reflectance R is made substantially zero is about 26 degrees, which is a constant value; however, by forming the transmitting face 61 into a curved shape, sound waves transmitted into the optical acoustic propagation medium portion 52 from different positions on the transmitting face 61 may be propagated toward a predetermined point so that the sound waves can be converged. Moreover, by bending the waveguide 60 along the transmitting face 61, one portion of the sound wave can be always made incident on the transmitting face 61 with a constant angle $\theta_a$ as the sound wave is being propagated through the waveguide 60. By using this function, the present second embodiment allows the sound wave to be propagated through the waveguide 60 to be refracted and transmitted little by little to the optical acoustic propagation medium portion 52 so that the sound wave is converged to one point inside the optical acoustic propagation medium portion 52 so as to achieve a high wave-receiving sensitivity.

Moreover, since the refractive angle $\theta_n$ indicated by expression (14) or the reflectance R indicated by expression (15) is not dependent on the frequency of a sound wave, the sound wave can be transmitted to the optical acoustic propagation medium portion 52 with high transmitting efficiency regardless of the frequency of the sound wave to be propagated. Therefore, the optical ultrasonic microphone 51 of the second embodiment makes it possible to detect a sound wave in a wide band with high sensitivity. That is, in accordance with the second embodiment of the present invention, it becomes possible to receive an ultrasonic wave in a high frequency range with a wide band that has been difficult to receive by using a conventional technique, with high sensitivity, and consequently to achieve a standard microphone having an effective band of 100 kHz or more and high sensitivity.

Additionally, in the field of an optical lens, for example, Japanese Patent No. 2731389 has disclosed a structure that allows light emitted from side faces of an optical waveguide to be converged. In general, in the optical waveguide, light is propagated while being repeatedly reflected by the border between a clad layer and the waveguide; in contrast, in the waveguide 60 of the second embodiment, the sound wave is not reflected by the outer face or the side face of the waveguide 60. For this reason, while in the optical waveguide, phases of light rays to be propagated are not aligned with one another, the present second embodiment makes it important to propagate sound waves with phases being aligned with one another. For this reason, the above-mentioned technique in the optical field is referred to as a technique derived from an idea completely different from that of the present second embodiment.

Figure 6A:
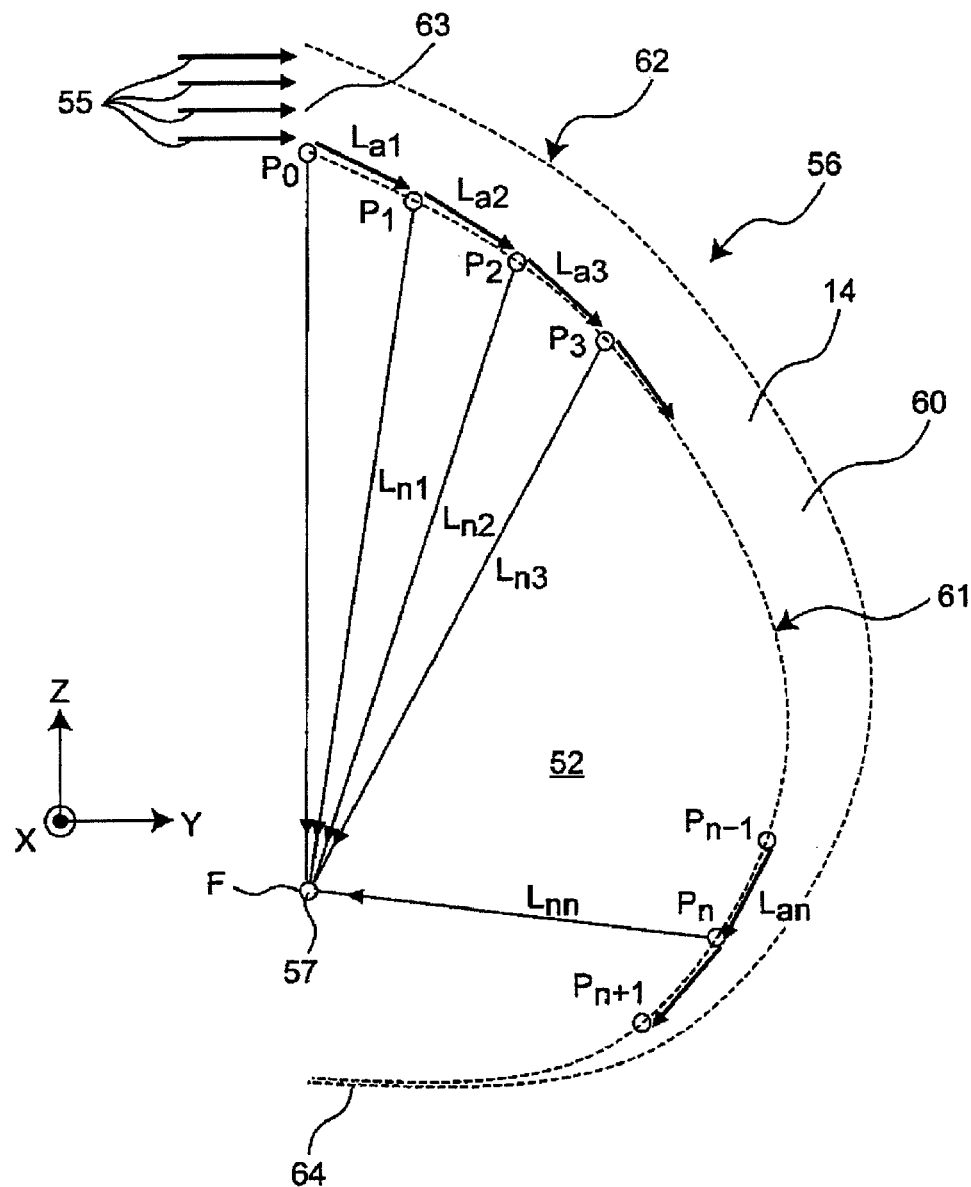
FIG. 6A is a view that explains sound wave convergence of the optical ultrasonic microphone in accordance with the second embodiment of the present invention.

FIG. 6A is a view that shows the waveguide 60 and the optical acoustic propagation medium portion 52 in an enlarged manner, with propagating paths of the sound wave being indicated by arrows with solid lines. In this case, the converging point 57 to which the sound wave is converged is set in the optical acoustic propagation medium portion 52. As explained in the first embodiment, the LDV head 8 is made face to face with the converging point 57 so that by utilizing laser light 58, the sound wave is detected by using the LDV head 8 and the LDV operation unit 9.

In FIG. 6A, a point at the opening 63 of the transmitting face 61 is defined as a starting point $P_o$, with points $P_1$, $P_2$, $P_3$, ..., $P_n$ being defined in this order from the closest side to the opening 63 of the transmitting face 61. Moreover, a distance from point $P_0$ to point $P_1$ is defined as $L_{a1}$, a distance from point $P_1$ to point $P_2$ is defined as $L_{a2}$, and, successively, a distance from point $P_{n-1}$ to point $P_n$ is defined as $L_{an}$. Furthermore, respective distances from point $P_1$, $P_2$, ..., $P_n$ to the converging point 57 are defined as $L_{n1}$, $L_{n2}$, ..., $L_{nn}$.

In order to allow a sound wave, made incident on the opening 63, propagated through the waveguide 60, and refracted and transmitted to the optical acoustic propagation medium portion 52, to be converged at the converging point 57, it is necessary to satisfy the following expression (16).

[Expression 16]

$$\frac{L_{a1}}{C_a} + \frac{L_{n1}}{C_n} = \frac{L_{a1} + L_{a2}}{C_a} + \frac{L_{n2}}{C_n} \quad (16)$$
$$= \frac{L_{a1} + L_{a2} + L_{a3}}{C_a} + \frac{L_{n3}}{C_n} = \ldots$$
$$= \frac{\sum_{k=1}^{n} L_{ak}}{C_a} + \frac{L_{nn}}{C_n}$$

The fact that the sound wave is converged at the converging point 57 in the optical acoustic propagation medium portion 52 means that the phases of the sound waves are aligned with one another at the converging point 57. That is, this means that the times of arrival of sound waves to the converging point 57 from the opening 63 are the same in any of the paths through which they have been propagated. More specifically, in expression (16), the left-hand side of the equal sign on the leftmost side indicates time required for the sound wave to reach the converging point 57 by being propagated up to distance $L_{a1}$ in the environmental fluid 14 and then being propagated in the optical acoustic propagation medium portion 52 by distance $L_{n1}$. Moreover, the right-hand side of the equal sign on the leftmost side indicates time required for the sound wave to reach the converging point 57 by being propagated up to distance ($L_{a1}$+$L_{a2}$) in the environmental fluid 14 and then by being propagated in the optical acoustic propagation medium portion 52 by distance $L_{n2}$. By using the same sequence of processes, time required for the sound wave at each of points $P_k$, transmitted from the waveguide 60 to the optical acoustic propagation medium portion 52, to reach the converging point 57 can be found.

In a case where expression (16) is generalized so that a distance in the waveguide from the opening 63 of the waveguide 60 to an arbitrary point $P_k$ along the propagation direction of the sound wave on the transmitting face 61 is defined as $L_{ak}$ and a distance from point $P_k$ to a converging point F (57) that is different from point $P_k$ in the optical acoustic propagation medium portion 52 is defined as $L_{nk}$, expression (16) is given as conditions that satisfy the following expression (17) with respect to arbitrary number k from 1 to n.

[Expression 17]

$$(L_{ak}/C_n)+(L_{nk}/C_n)=\text{const.} \quad (17)$$

As described earlier, expression (17) indicates that time required for the sound wave to reach the converging point 57 from the opening 63 at an arbitrary position on the transmitting face 61 is made constant, whichever position is taken. In other words, the fact that the aforementioned expression (17) is satisfied means that the sound wave received by the optical acoustic propagation medium portion 52 is converged to the sound wave converging point 57. In the structure shown in FIG. 5A, the shape on the acoustic waveguide 60 side of the optical acoustic propagation medium portion 52 satisfies expression (17).

That is, as described earlier, FIG. 6A is a view that explains this principle, and even in a case where a sound wave proceeds into the dried silica gel 52 from an arbitrary point on the inner side face 61 of the acoustic waveguide 60 of the optical acoustic propagation medium portion 52 with the acoustic waveguide opening 63 being as its starting point, the sound wave is converged to the sound wave converging point 57 as long as it is located on the acoustic waveguide inner side face 61 that satisfies expression (17). This is because a shape forming a wavefront having a cylindrical shape (partially cylindrical shape) centered on the sound wave converging point 57 is prepared inside the optical acoustic propagation medium portion 52.

Strictly speaking, the propagation distance of a sound wave propagated through the waveguide 60 is considered to be calculated more accurately, when the center path of the waveguide 60 is utilized. However, as will be explained below, the width dimension of the waveguide 60 is sufficiently small in comparison with its length. For this reason, the above-mentioned approximation is allowed to exert sufficient precision for practical use.

The following description will discuss how to design the shapes of the transmitting face 61 and the waveguide outer face 62 that defines the waveguide 60. The shapes of the transmitting face 61 and the waveguide outer face 62 are designed through the following steps.

First, based upon the size of the opening 63 of the waveguide 60, the length of the waveguide 60 is determined so as to allow the optical acoustic propagation medium portion 52 to efficiently receive a sound wave. Based upon the length of the waveguide 60, the transmitting face 61 is designed as a shape for converging the sound wave. Thereafter, by taking into consideration the shape of the transmitting face 61 thus determined and the width of the waveguide 60 to be required, the shape of the transmitting face 61 is designed.

The size of the opening 63 of the waveguide 60 is preferably set to ½ or less of the wavelength of the sound wave to be received. In a case where the width of the waveguide is larger than ½ of the wavelength of the sound wave to be propagated, the sound wave tends to be easily reflected in the waveguide 60 to cause disturbance in the propagation of the sound wave, making it difficult to measure the sound wave.

In the present second embodiment, since an attempt is made to receive a sound wave, for example, up to a frequency of 80 kHz, the size is set to 2.0 mm that is smaller than 2.1 mm that is a ½ wavelength of the frequency of 80 kHz, and the opening 63 is set to have a square shape, with each side being set to 2.0 mm. The end portion 72 of the converging unit 77 is designed to have the same size as that of the opening 63.

Figure 12:
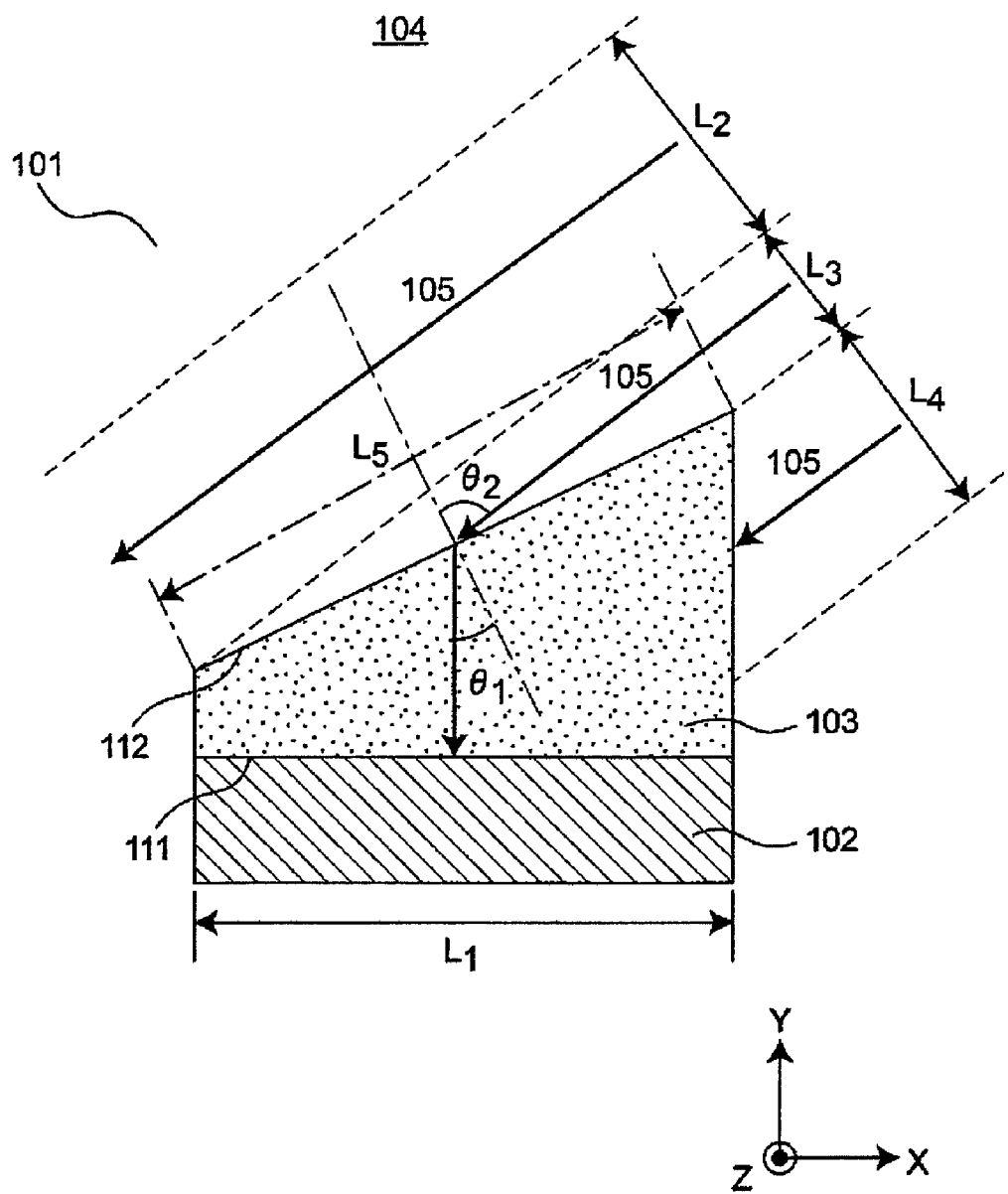
FIG. 12 is a block diagram that shows a conventional optical microphone in Patent Document 3.

The length of the waveguide 60 is preferably set to such a sufficient length as to refract and transmit as many portions of the sound wave to be propagated through the waveguide 60 as possible into the optical acoustic propagation medium portion 52. As explained by reference to FIG. 12, in the case of a refractive propagation type sound wave, the sound wave that has been propagated in the range of length $L_3$ is transmitted into the optical acoustic propagation medium portion 103 through the second surface region 112. In FIG. 12, the length $L_3$ and the length $L_5$ correspond to the length in the Z-direction of the opening 63 on the YZ plane and the length on the YZ plane of the transmitting face 61 of the waveguide 60 shown in FIG. 6A. When the length on the YZ plane of the transmitting face 61, that is, the length in the propagation direction $g_6$ of the wave length in the waveguide 60, is not sufficient, the sound wave cannot be sufficiently transmitted to the optical acoustic propagation medium portion 52 with the result that adverse effects, such as a reduction in measuring precision, occur due to a reduction in wave-receiving sensitivity or influences by the reflection of a sound wave that has not been received.

In the present second embodiment, since $\theta_a$ (FIG. 5E) that is an angle made by the normal to the optical acoustic propagation medium portion 52 in the environmental fluid 14 and the sound wave propagation direction $55_a$ is about 89.3 degrees, the ratio of the length $L_2$ and the length $L_1$ forms about $L_1/L_2=88$. For this reason, optimally, the waveguide 60 preferably has a length that is more than about 90 times or more the length of the opening 63. In the present second embodiment, the opening 63 of the waveguide 60 is 2 mm, and the length of the waveguide 60 is set to 200 mm that is 100 times longer than that of the opening 63.

The lengths of the opening 63 and the waveguide 60 are determined in this manner, and based upon the length of the waveguide 60, the shape of the transmitting face 61 is designed, and the shape of the waveguide outer face is further designed.

In the optical ultrasonic microphone 51 of the second embodiment arranged as described above, FIGS. 6B to 6G show the results found by numerical experiments carried out on processes in which a sound wave that is propagated through the waveguide 60 is transmitted to the optical acoustic propagation medium portion 52, and then converged to the converging point 57. In FIGS. 6B to 6G, in order to clearly indicate the position or phase of the sound wave, only the waveguide 60 and the optical acoustic propagation medium portion 52 of the optical ultrasonic microphone 51 are shown.

Figure 6B:
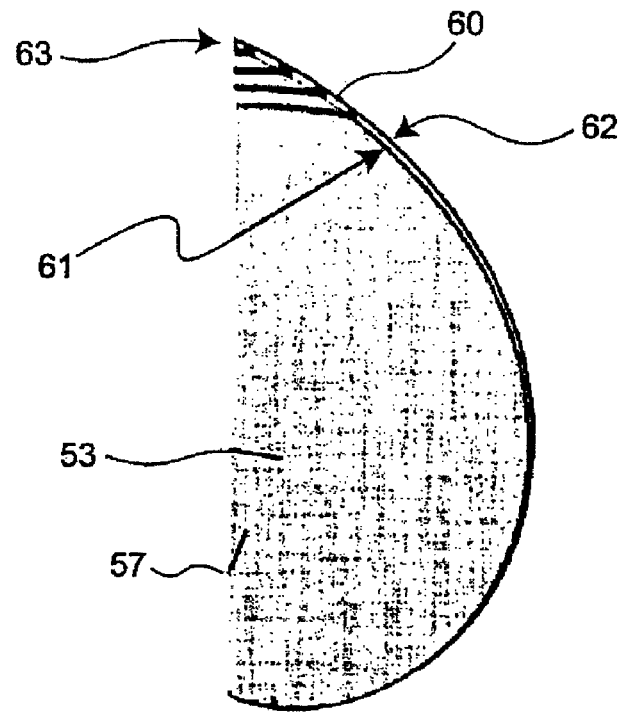
FIG. 6B is a view that shows the results of numerical experiments that specifically show a propagation state of a sound wave in the optical ultrasonic microphone shown in FIG. 5A.
Figure 6C:
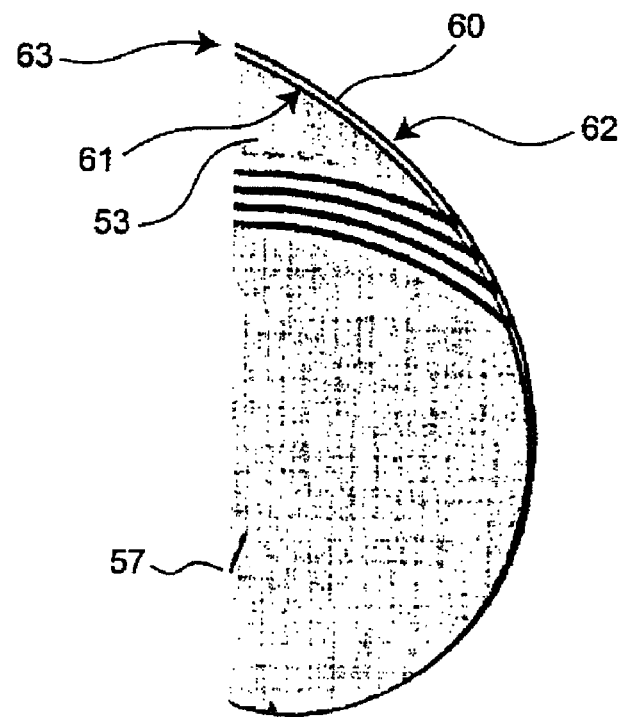
FIG. 6C is a view that shows the results of numerical experiments that specifically show a propagation state of a sound wave in the optical ultrasonic microphone shown in FIG. 5A.
Figure 6D:
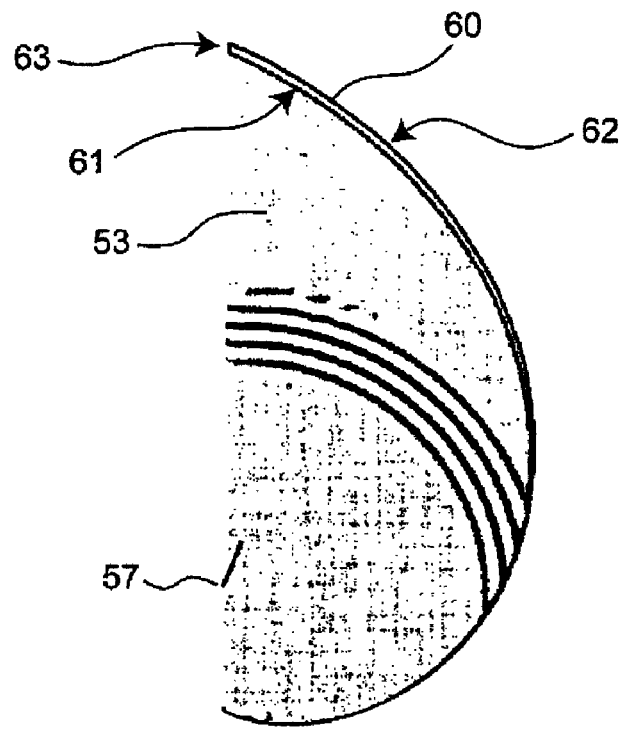
FIG. 6D is a view that shows the results of numerical experiments that specifically show a propagation state of a sound wave in the optical ultrasonic microphone shown in FIG. 5A.
Figure 6E:
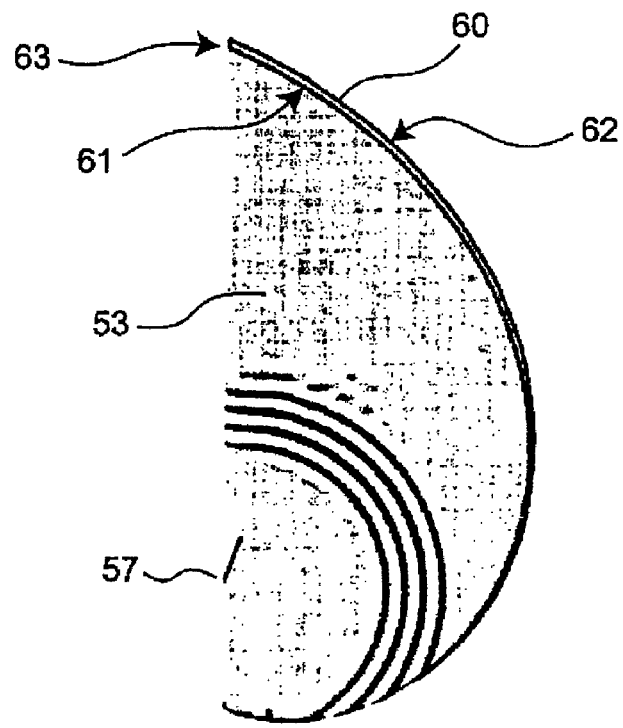
FIG. 6E is a view that shows the results of numerical experiments that specifically show a propagation state of a sound wave in the optical ultrasonic microphone shown in FIG. 5A.
Figure 6F:
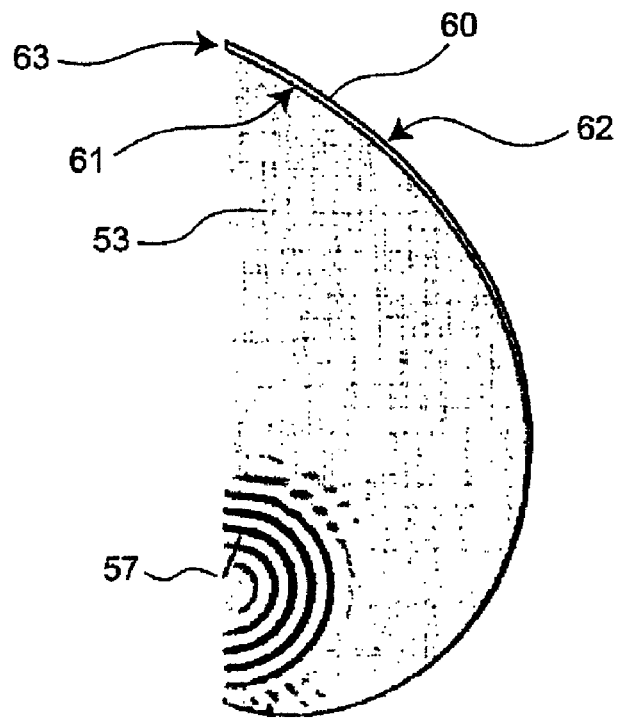
FIG. 6F is a view that shows the results of numerical experiments that specifically show a propagation state of a sound wave in the optical ultrasonic microphone shown in FIG. 5A.
Figure 6G:
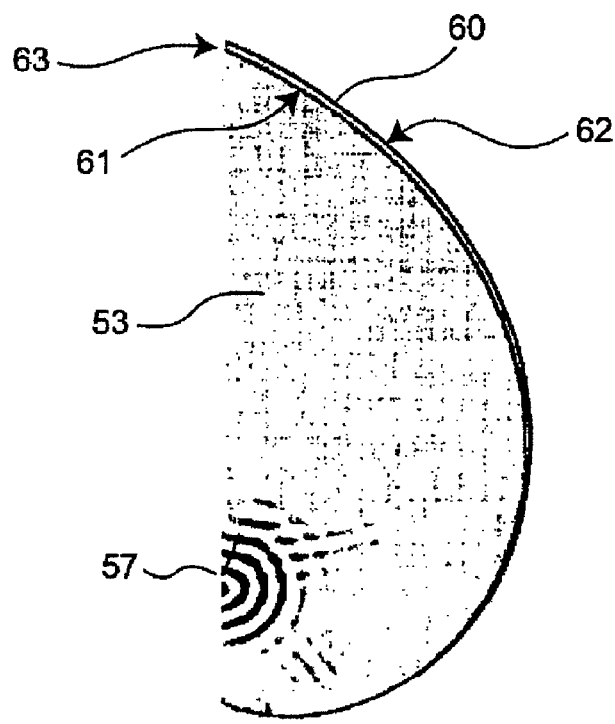
FIG. 6G is a view that shows the results of numerical experiments that specifically show a propagation state of a sound wave in the optical ultrasonic microphone shown in FIG. 5A.

Each of FIGS. 6B to 6G shows a state in which a sound wave is propagated with time, and FIG. 6B shows the state that is earliest in time, and FIG. 6G shows the state that is latest in time. The transmitting face 61 and the waveguide outer face 62 that define the waveguide 60 shown in FIGS. 6B to 6G are designed so as to allow a sound wave that is being propagated through the waveguide 60 to be converged to the converging point 57 through the above-mentioned sequence of processes. The opening 63 of the waveguide 60 is located above, while the closed terminal is located below. In this case, the inside of the waveguide 60 is filled with air serving as the environmental fluid 14.

Figure 6H:
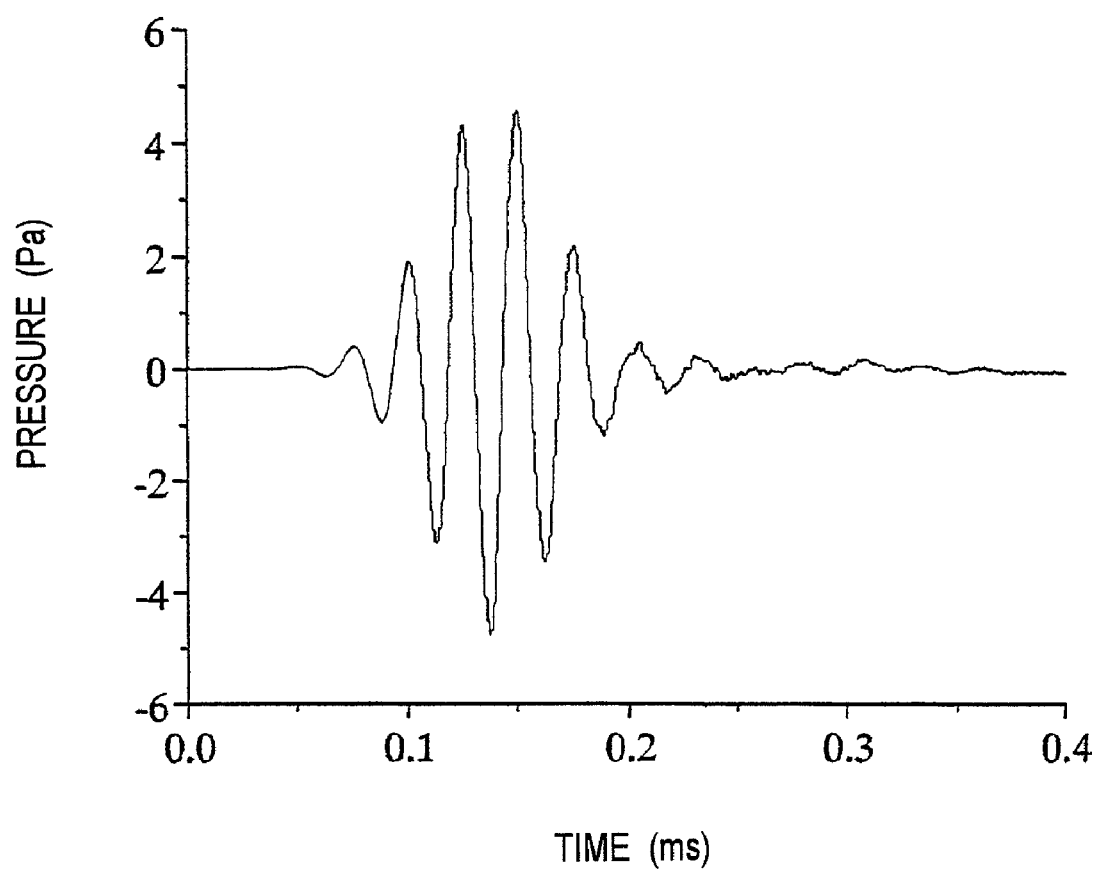
FIG. 6H is a view that shows waveforms of sound waves used in the experiments shown in FIGS. 6B to 6G.
Figure 6:
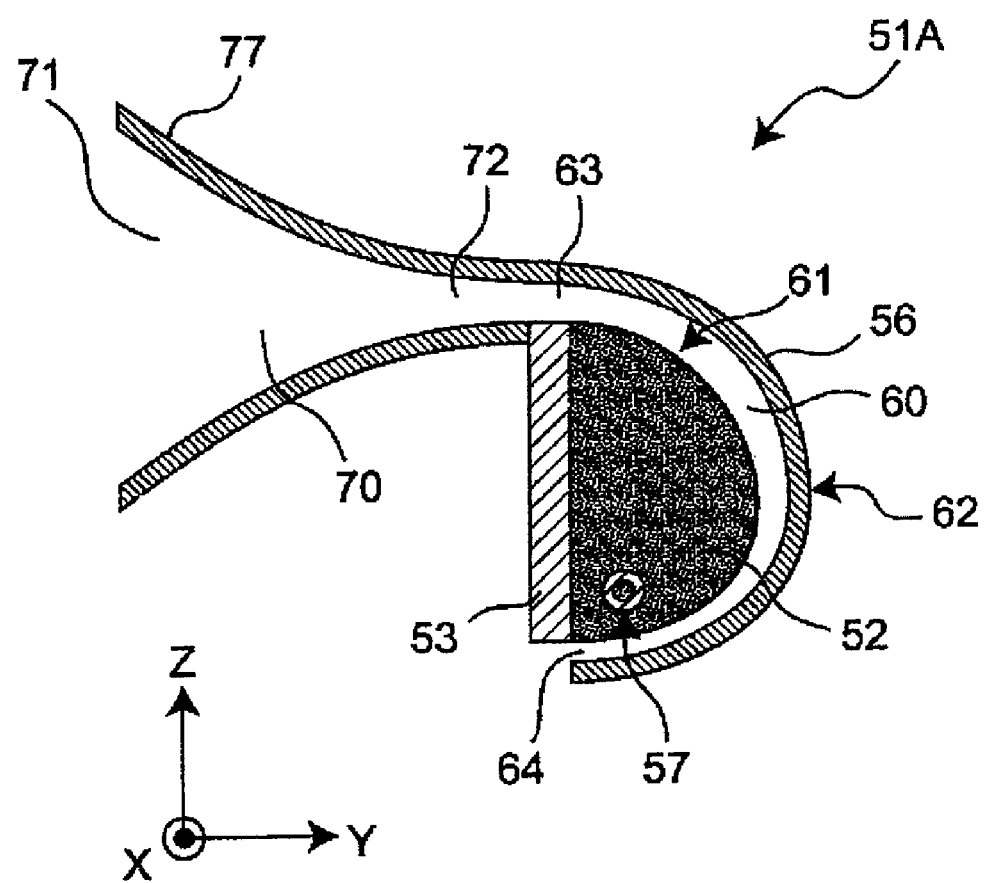
FIG. 6I is a cross-sectional view that shows a modified example of the second embodiment of the present invention.

FIG. 6H shows a waveform of a sound wave to be made incident on the opening 63. The center frequency of the sound wave is about 40 kHz, and the sound wave has a length corresponding to about five wavelengths. In FIGS. 6B to 6G, sound pressure levels of the sound waves inside the optical acoustic propagation medium portion 52 as well as inside the waveguide 60 are indicated by thick and thin portions in colors. The portions having the thick color represent sound pressures that are higher than the atmospheric pressure serving as the standard, while the portions having the thin color represent sound pressures that are lower than the atmospheric pressure. The gap between the same colors, that is, for example, black and black, or white and white, corresponds to 40 kHz, that is, corresponding to one wavelength of the sound wave. In FIGS. 6B to 6G, it is very difficult to confirm since the waveguide 60 is very narrow; however, inside the waveguide 60, since the sound velocity of air is 340 m/s, the distance between the same colors, that is, the distance of one wavelength, corresponds to about 8.5 mm. On the other hand, in the optical acoustic propagation medium portion 52, since the sound velocity of the dried gel forming the optical acoustic propagation medium portion 52 is 150 m/s, the distance between the same colors, that is, the distance of one wavelength, corresponds to about 3.75 mm.

FIG. 6B shows a moment at which three wavelength portions of a sound wave have been propagated to the waveguide 60 from the opening 63 and the peak of an amplitude of the fourth wave is being just propagated to the inside of the waveguide 60 from the opening 63. The portions of the sound wave that have been propagated to the waveguide 60 are propagated to the inside of the optical acoustic propagation medium portion 52 from the transmitting face 61 that is made in contact with the waveguide 60. Portions inside the optical acoustic propagation medium portion 52, which are indicated by thick and thin color portions, correspond to components of the sound wave that have been refracted and transmitted from the transmitting face 61 to the optical acoustic propagation medium portion 52.

FIG. 6C shows a slightly advanced state in time from the state shown in FIG. 6B, and inside the waveguide 60, the sound wave is being propagated along the shape of the waveguide 60. Moreover, in this state, the sound wave propagated inside the waveguide 60 is gradually refracted and transmitted to the optical acoustic propagation medium portion 52, and is being propagated through the optical acoustic propagation medium portion 52. As shown in FIGS. 6B and 6C, sound waves indicated by thick and thin, black and white portions have been propagated in a longer distance from the opening 63 in the waveguide 60 than in the optical acoustic propagation medium portion 52. This fact shows that the sound velocity of air that is the environmental fluid 14 in the waveguide 60 is faster than the sound velocity of the dried gel that is the propagation medium.

FIG. 6D also shows a state in which, as one portion of the sound wave is propagated through the waveguide 60, it is refracted and transmitted to the optical acoustic propagation medium portion 52, and is propagated through the inside of the optical acoustic propagation medium portion 52. Since refracting and transmitting processes are carried out, the pattern indicated by the thick and thin, black and white portions is bent on the transmitting face 61; however, inside the optical acoustic propagation medium portion 52, the pattern indicated by the thick and thin, black and white portions is drawn as a clear curved line. This shows that the phases of the sound wave that is being propagated inside the optical acoustic propagation medium portion 52 are aligned with one another.

FIG. 6E shows a sound wave being propagated virtually near the terminal of the waveguide 60 and a sound wave that is being gradually converged toward the converging point 57 inside the optical acoustic propagation medium portion 52.

FIG. 6F shows a state in which the propagation of the sound wave has further advanced so that the sound wave, which is being propagated inside the waveguide 60, has reached the waveguide terminal, and all the sound wave is refracted and transmitted to the inside of the optical acoustic propagation medium portion 52 so that the sound wave, which is being propagated inside the optical acoustic propagation medium portion 52, is being further converged to the converging point 57.

FIG. 6G shows a state in which the first wave face of the sound wave propagated inside the optical acoustic propagation medium portion 52 has reached the converging point 57. As shown in FIG. 6G, the black portions of thick and thin portions become thicker. This indicates that in the converging point 57, the sound wave is converged so that the sound pressure is increased.

Although no specific numeric values have been shown in FIGS. 6B to 6G, the experimental results show that in a case where a change in sound pressure due to the sound wave from the atmospheric pressure is about 4 Pa inside the waveguide 60, the change in sound pressure from the atmospheric pressure in the vicinity of the converging point 57 becomes about 34 Pa. This shows that the sound pressure of the sound wave is increased to 8 times or more, and that the second embodiment makes it possible to observe the sound wave in the environmental fluid with high sensitivity.

In accordance with the present second embodiment, by allowing a sound wave to be refracted and transmitted through the optical acoustic propagation medium portion 52 from the environmental fluid 14, the reflection of the sound wave on an interface of different acoustic impedances is suppressed so that the sound wave can be transmitted through the optical acoustic propagation medium portion 52 with high efficiency. Moreover, by arranging the optical acoustic propagation medium portion 52 so as to form one face of the waveguide 60 filled with the environmental fluid 14, the shape of the face to be made in contact with the waveguide 60 can be designed so that, as a sound wave is being propagated through the waveguide 60, one portion of the sound wave is transmitted to the optical acoustic propagation medium portion 52, and converged to a predetermined converging point 57, thereby making it possible to make the phases of sound waves transmitted to the optical acoustic propagation medium portion 52 little by little coincident with one another to be converged to the converging point 57. Therefore, by utilizing most of sound waves made incident on the waveguide 60 from the opening 63, the sound waves can be converged so that the sound pressure of the received sound waves can be increased. Thus, it becomes possible to detect sound waves with high sensitivity.

Additionally, in the optical ultrasonic microphone 51 of the second embodiment, the terminal of the waveguide 60 is closed. However, the terminal of the waveguide 60 may be opened. In an optical ultrasonic microphone 51A in accordance with a modified example of the second embodiment shown in FIG. 6I, a terminal portion 64A of the waveguide 60 is opened. In a case where energy of a sound wave to be propagated through the waveguide 60 is comparatively high so that all the energy needs not be taken up, among sound waves to be propagated through the waveguide 60, those portions that have not been transmitted into the optical acoustic propagation medium portion 52 are preferably removed from the waveguide 60 so as not to cause adverse effects by being reflected at the terminal. In accordance with a sound wave-receiver 103, since the terminal 64 of the waveguide 60 is opened, those sound waves that have not been transmitted to the optical acoustic propagation medium portion 52 can be removed. Therefore, it is possible to detect a target sound wave accurately, without causing disturbance in the received sound wave. In this case, the length of the waveguide 60 may be made shorter than a preferable length that is determined relative to the opening as described above.

Figure 7:
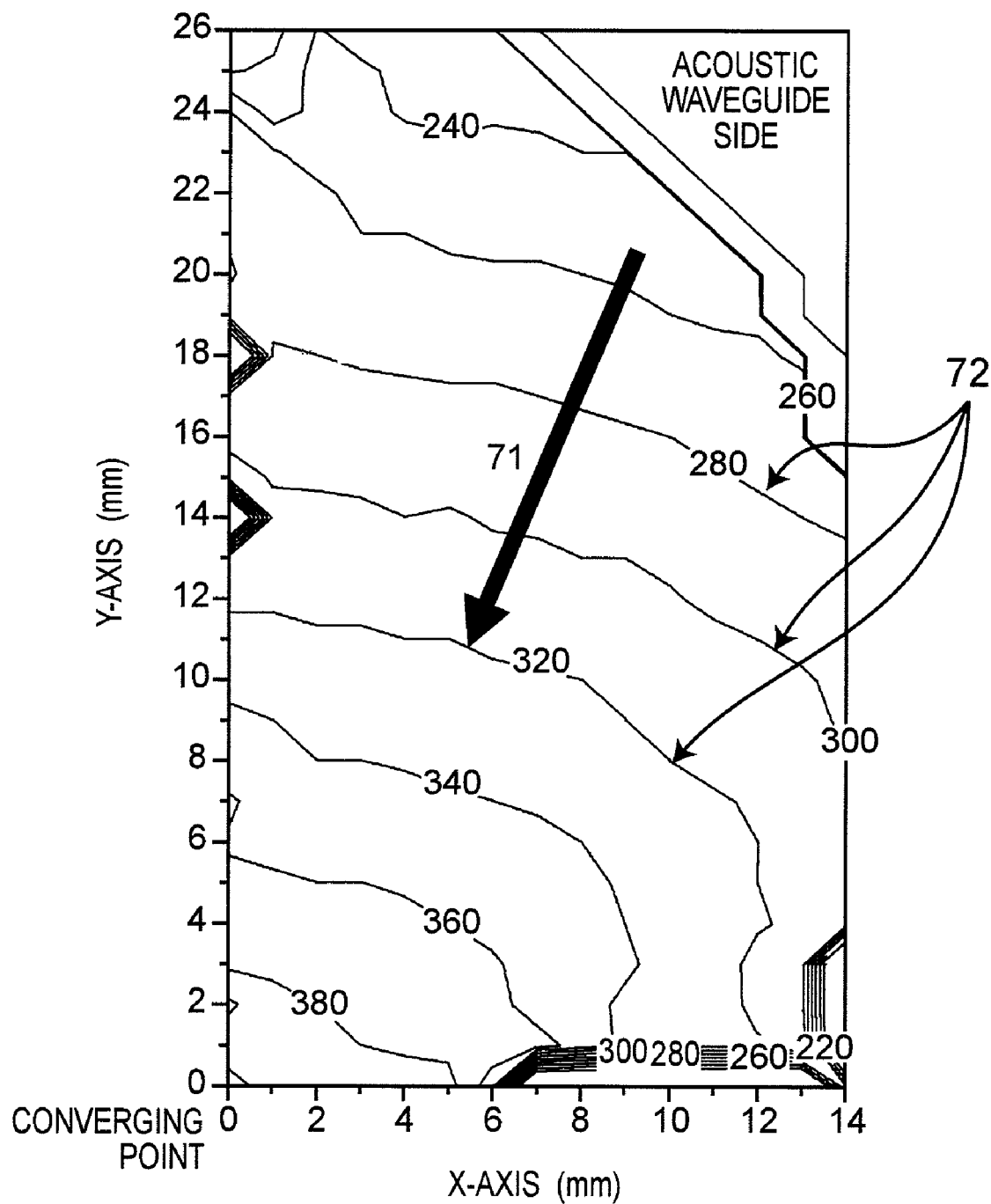
FIG. 7 is a view that shows the results of measurements on the isophase wavefront of sound wave propagation of an optical acoustic propagation medium portion of the optical ultrasonic microphone in accordance with the second embodiment of the present invention.

FIG. 7 shows a state of isophase wavefrons 72 of propagated sound waves based upon the results of measured propagation time on sound wave propagations inside a dried silica gel 52 carried out through two-dimensional scanning by the LDV head 8 in the optical ultrasonic microphone 51. For example, a dried silica gel having a density of 270 kg/m$^3$ and a sound velocity of 145 m/s was used as one example of the optical acoustic propagation medium portion 52. In this case, an incident angle at each of the points is 89.5 degrees and a refractive angle is 26 degrees. The curved face is designed based upon this sound velocity value. It is observed that the sound wave propagation direction 71 and the isophase wavefront 72 allow the dried silica gel 52 to be propagated toward the sound wave converging point 57 as a cylindrical wave so that operations as theoretically designed can be confirmed.

Figure 8:
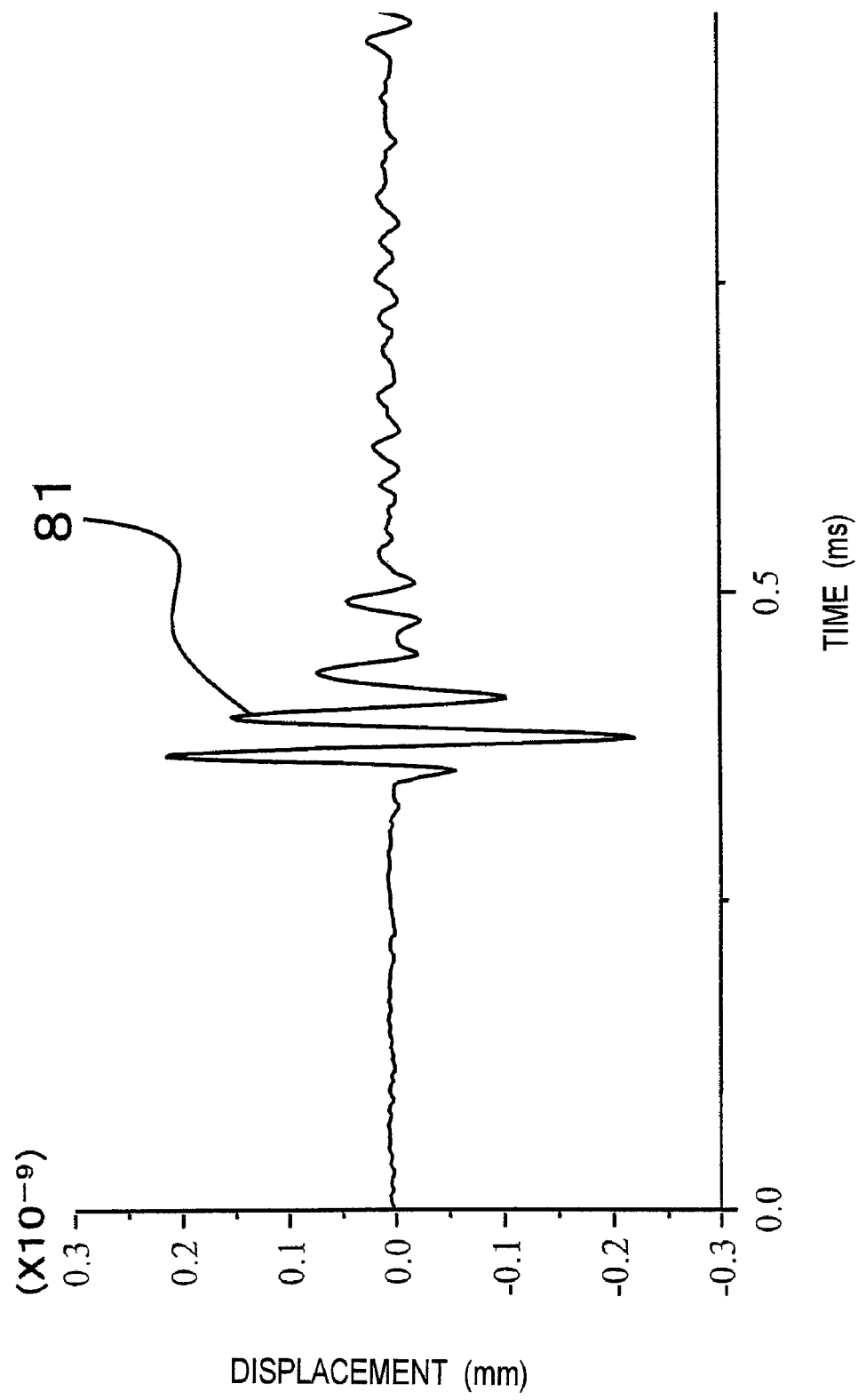
FIG. 8 is a view that shows one example of an LDV output waveform of the optical ultrasonic microphone in accordance with the second embodiment of the present invention.

FIG. 8 shows one example of an LDV output waveform (waveform measured by amplitude measurement) 81 of the optical ultrasonic microphone 51 in the vicinity of the sound wave converging point 57. In the same manner as in the first embodiment, the results have been obtained in a case where a driving signal having one wavelength with a center frequency of 40 kHz is radiated from a wide-band tweeter as a measuring sound wave. By taking the center frequency of 40 kHz into consideration, each of the width and the initial height (height at the opening portion 54) of the acoustic waveguide 60 was set to 4 mm. The thickness of the dried silica gel that is one example of the optical acoustic propagation medium of the optical acoustic propagation medium portion 52 is also set to 4 mm. A laser Doppler vibrometer (LDV head 8) of a heterodyne system using an He—Ne laser with a wavelength of 633 nm was used for measuring laser light 58 that reciprocatingly propagates through the optical acoustic propagation medium portion 52, as one example of the light source and the optical detecting means. The modulation of light by the sound wave corresponds to a frequency modulation. An aluminum material is used as the base 3. Laser light 58 projected from the He—Ne laser is made incident on the dried silica gel 52 through a measuring through hole (through hole formed as the converging point 57) 53a of the base 53 positioned on the surface side of the dried silica gel 52, and after having passed through the dried silica gel 52 in its thickness direction, is then reversely propagated through the optical path, and after having been reflected by the inner face of the base 53 on the rear face side of the dried silica gel 52, is again allowed to pass through the dried silica gel 52 in its thickness direction, and emitted from the through hole 53a of the base 53 positioned on the surface side of the dried silica gel 52, and then returned to the LDV head 8. Therefore, the optical path for use in measuring the sound wave is set to 8 mm that is two times larger than the thickness 4 mm of the dried silica gel 52.

From the results shown in FIG. 8, it is found that a wave-receiving characteristic having a very wide band is prepared in the same manner as the first embodiment. The waveform 81 of FIG. 8 shows that a peak displacement is about 5 nm. The sound pressure P converted from expression (11) is about 54.2 Pa. The input conversion sound pressure at the acoustic horn terminal is about 25 Pa so that a converging effect as high as about two times can be confirmed. In this case also, the sound pressure to be measured and converted and the input conversion sound pressure are sufficiently made coincident with each other from the viewpoint of order, and by appropriately calibrating the sound pressure to be measured and converted, it becomes possible to carry out very accurate sound pressure measurements.

In the second embodiment, by converging the sound wave inside the dried silica gel 52, it becomes possible to receive a sound wave with a wide band with higher sensitivity.

Third Embodiment

Figure 9:
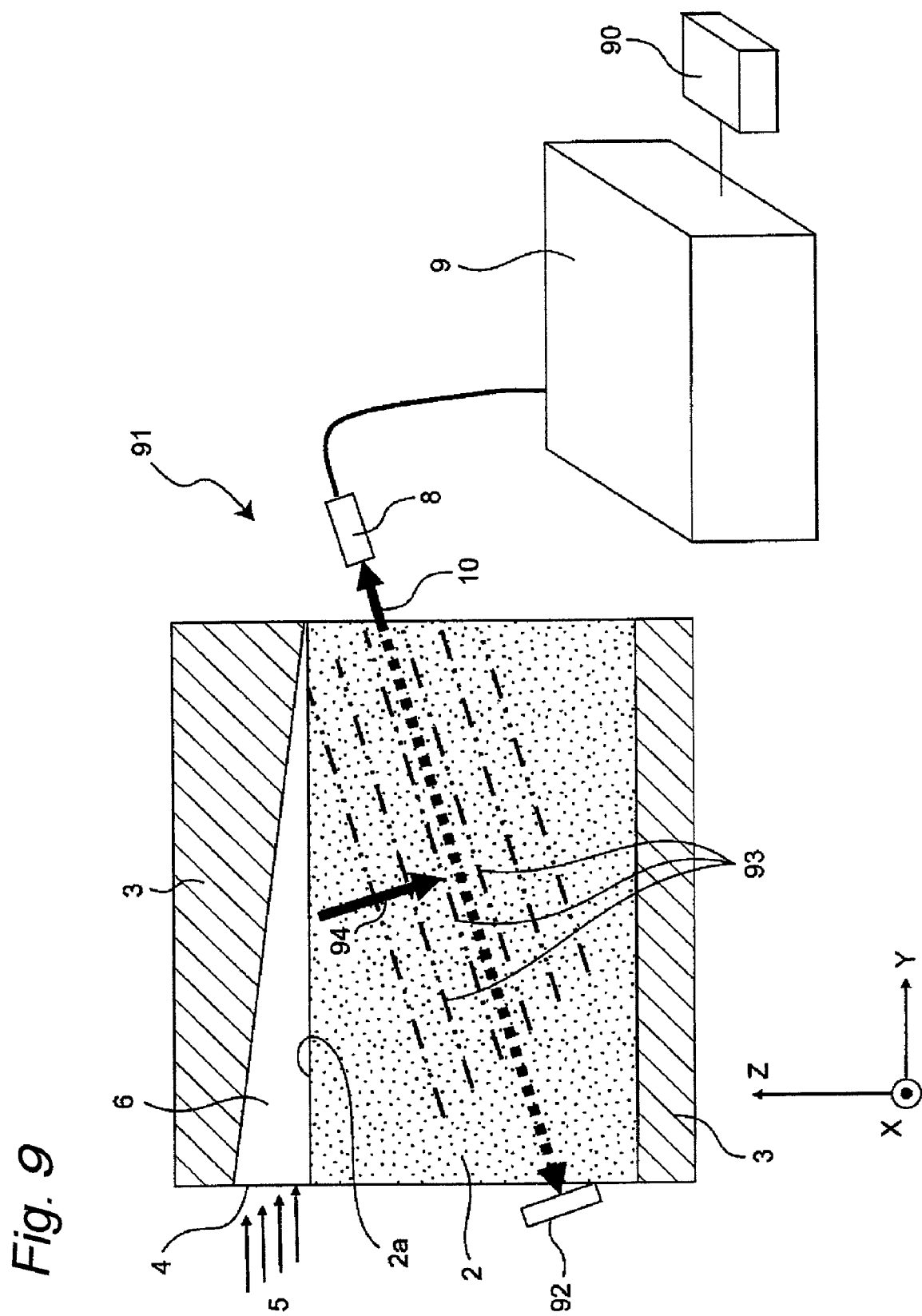
FIG. 9 is a Y-Z line cross-sectional view that shows the optical ultrasonic microphone of a third embodiment of the present invention.

FIG. 9 is a YZ cross-sectional view that shows an optical ultrasonic microphone 91 in accordance with a third embodiment of the present invention. The structure shown in FIG. 9 differs from that of the first embodiment shown in FIGS. 1A and 1B in that the relative positional relationship between the LDV head 8 and the dried silica gel serving as one example of the optical acoustic propagation medium portion 2 is different and in that a mirror 92 is installed therein. Reference 94 represents a sound wave propagation direction of a sound wave in the dried silica gel 2, and reference numeral 93 represents an isophase wavefront of the sound wave propagation in a simulated manner.

That is, the LDV head 8 has its optical axis disposed not in the thickness direction of the optical acoustic propagation medium portion 2, but in a direction orthogonal to the thickness direction, in a manner so as to be made face to face with the mirror 92. Preferably, as shown in FIG. 9, the optical axis of the LDV head 8 is disposed so as to tilt relative to the upper face 2a that forms one portion of the acoustic waveguide 6 of the rectangular optical acoustic propagation medium portion 2. More specifically, an optical path formed between the LDV head 8 and the mirror 92 is designed to be disposed in a direction orthogonal to the sound wave propagation direction 94 of the sound wave, in which the sound wave is allowed to proceed to the optical acoustic propagation medium portion 2 from the upper face 2a. The laser light 10 emitted from the LDV head 8 enters the optical acoustic propagation medium portion 2, and proceeds in the optical acoustic propagation medium portion 2 along the isophase wavefront 93 of the sound wave propagation, and is reflected by the mirror 92 disposed to face the LDV head 8, and then again allowed to proceed the same optical path, and proceeds in the optical acoustic propagation medium portion 2 along the isophase wavefront 93 of the sound wave propagation, and emitted from the inside of the optical acoustic propagation medium portion 2, and received by the LDV head 8. The LDV head 8 needs not to carry out a scanning process, and is fixedly secured.

As shown in FIG. 4 in the first embodiment, the sound wave propagation inside the dried silica gel 2 is carried out in a plane wave state so that a linear wave face 42 is successfully formed. The third embodiment utilizes this phenomenon, and allows the laser light 10 to be propagated in a long distance in parallel with the wave face 93. Since light is propagated at an extremely higher speed in comparison with the sound wave, it becomes possible to improve the sensitivity by extending the length of the optical path without a delay in time. Therefore, in accordance with the third embodiment, as one example, the length of the optical path, which is set to 8 mm in the first embodiment, can be extended to about 45 mm so that, even when the effective path length in which an interactive function occurs due to overlapped sound waves and light is taken into consideration, it is possible to improve the sensitivity by about five times or more.

Figure 10:
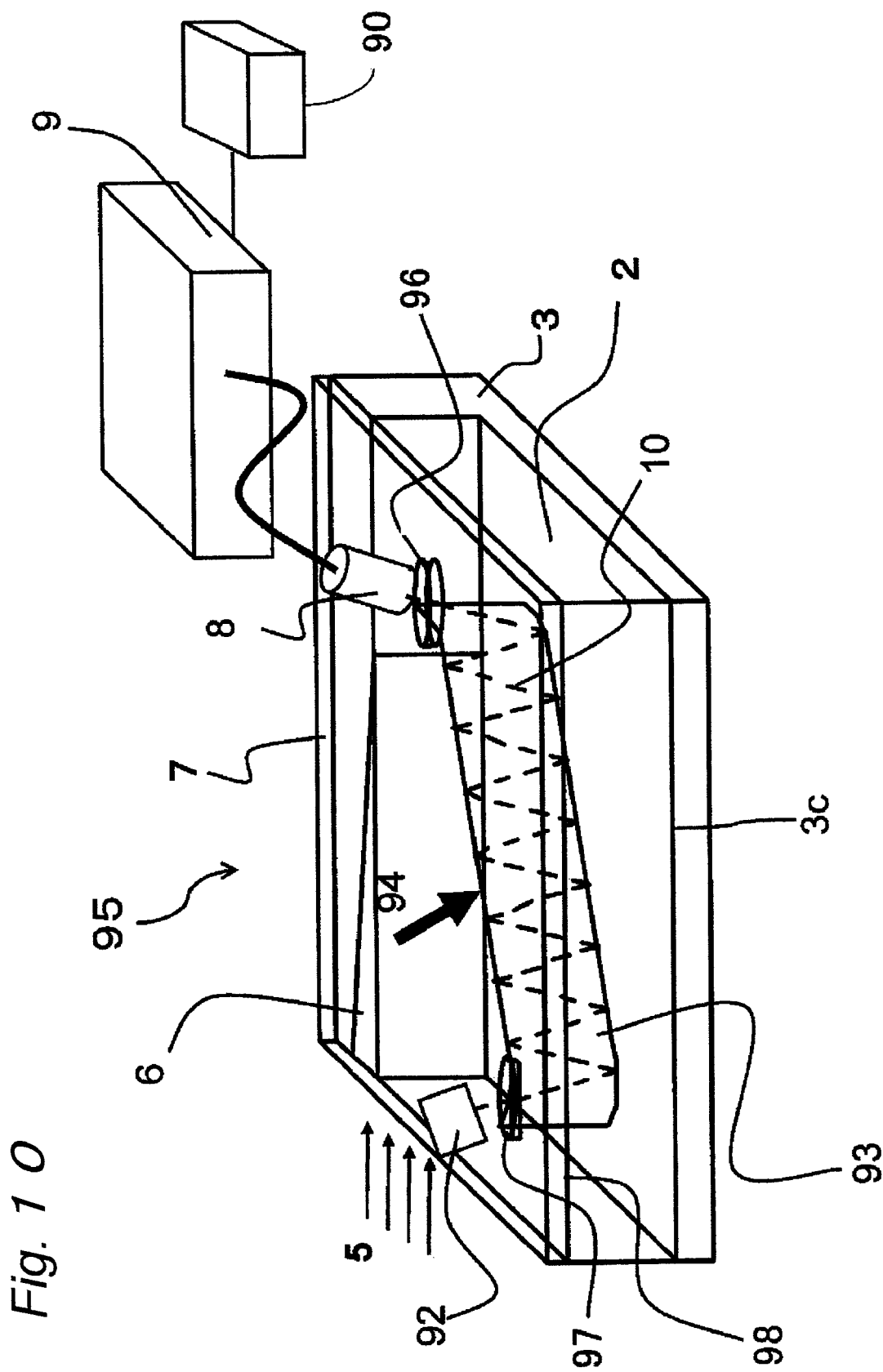
FIG. 10 is a perspective view that shows a partially perspective state of the optical ultrasonic microphone in accordance with a modified example of the third embodiment of the present invention.
Figure 11:
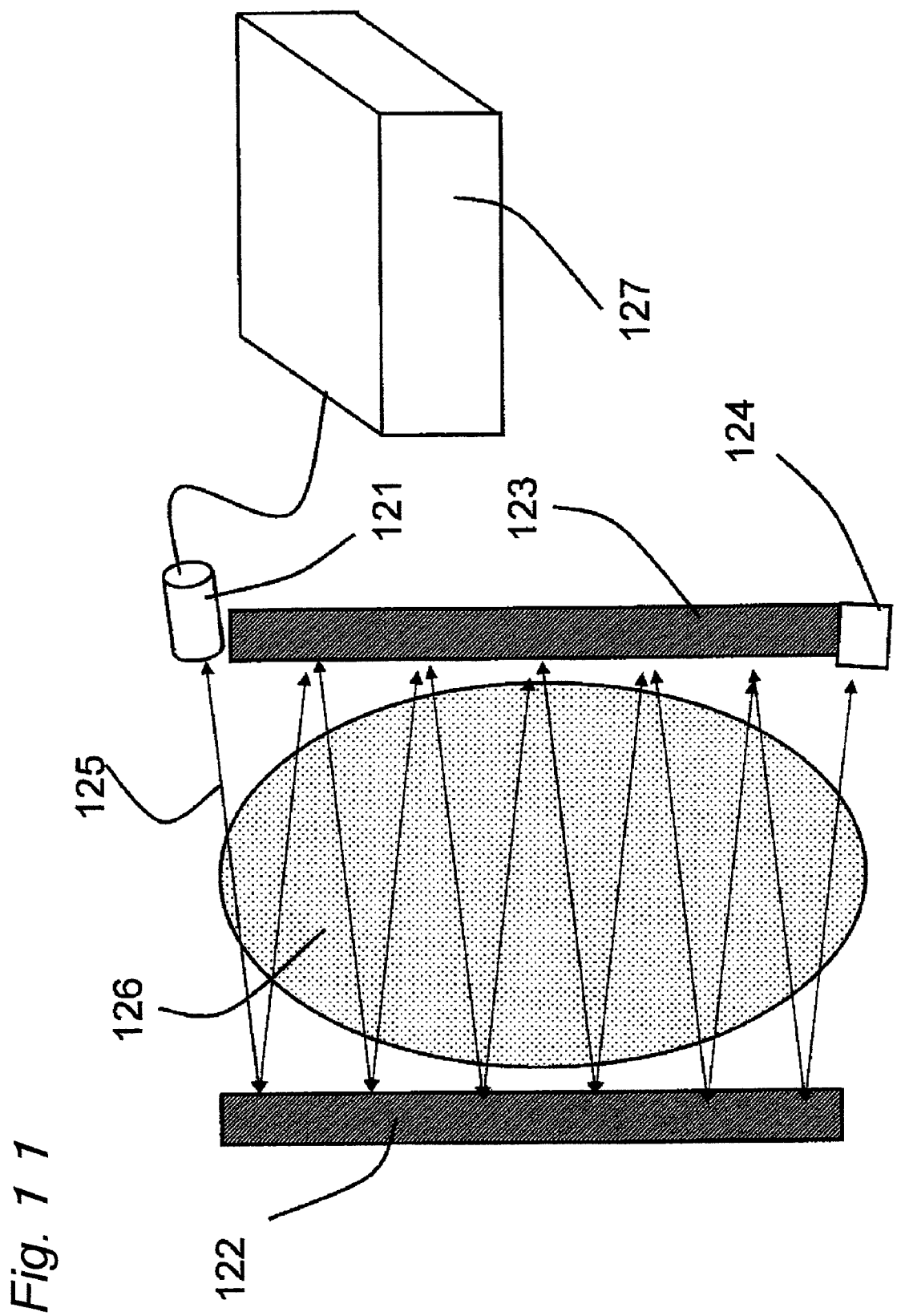
FIG. 11 is a cross-sectional view that shows a conventional ultrasonic wave transmitter/receiver in Patent Document 2.

FIG. 10 is a perspective view that shows a partially perspective state of an optical ultrasonic microphone 95 in accordance with a modified example of the third embodiment of the present invention. The structure of FIG. 10 differs from that of the third embodiment shown in FIG. 9 in that the relative positional relationship among the LDV head 8, the mirror 92, and the dried silica gel 2 is different and in that a light reflective face 98 and light transmitting windows 96 and 97 are installed therein.

In the optical ultrasonic microphone 95 of FIG. 10, a light reflective face 98 is formed on the border face between the transparent supporting plate 7 and the optical acoustic propagation medium portion 2 of the dried silica gel. The light reflective face 98 is easily formed by vapor depositing metal such as aluminum on one surface of the transparent supporting plate 7. The laser light 10 is applied and received through the light transmitting windows 96 and 97 formed on one portion of the transparent supporting plate 7. Additionally, in FIG. 10, for convenience of explanation of operations of the third embodiment, the structure of the back face from the light reflective face 98 is illustrated as a perspective view. The light transmitting windows 96 and 97 can be formed by using a contact mask or the like upon vapor-depositing metal on the transparent supporting plate 7. The light-transmitting windows 96 and 97 are disposed in a direction in parallel with the isophase wavefront 93 of the sound wave propagation. The LDV head 8 and the mirror 92 are respectively placed on the light-transmitting windows 96 and 97 so that predetermined incident angles and reflective angles are maintained by a holding mechanism, not shown.

In accordance with the above-mentioned arrangement, the laser light 10 emitted from the LDV head 8 is allowed to pass through the light-transmitting window 96, and made incident on the optical acoustic propagation medium portion 2 of the silica nano-porous material, and is then propagated through the inside of the isophase wavefront 93, while being reflected by the border face (concave bottom face 3c of the base 3) between the optical acoustic propagation medium portion 2 of the silica nano-porous material and the base 3 as well as by the light reflective face 98, with predetermined angles. For example, the laser light 10 made incident on the optical acoustic propagation medium portion 2 from the light-transmitting window 96 is reflected by the concave bottom face 3c of the base 3 after having been transmitted through the optical acoustic propagation medium portion 2, and is reflected by the light reflective face 98 after having been again transmitted through the optical acoustic propagation medium portion 2. The laser light 10 reflected by the light reflective face 98 is reflected by the concave bottom face 3c of the base 3, after having been transmitted through the optical acoustic propagation medium portion 2, and is then reflected by the light reflective face 98, after having been again transmitted through the optical acoustic propagation medium portion 2. After the laser light 10 has been propagated through the optical acoustic propagation medium portion 2 along the isophase wavefront 93 by repeating these processes, the laser light 10 thus reached the light-transmitting window 97 is transmitted through the light-transmitting window 97, and is reflected by the mirror 92 in the incident direction so that it is propagated in a reversed direction, and allowed to pass through the light-transmitting window 96 to reach the LDV head 8. Since the propagating speed of the laser light 10 is faster than the sound velocity inside the silica nano-porous material 2 by about six digits, its movement in the propagation direction 94 on the isophase wavefront 94 is negligible. Supposing that the distance between the light-transmitting windows 96 and 97 is D, that the reflective angle of the laser light 10 inside the silica nano-porous material 2 is θ, and that the thickness of the silica nano-porous material 2 is t, the following relationship indicated by expression (18) is satisfied. In this case, N represents the number of repetitions, and L represents an optical path length on one way from the LDV head 8 to the mirror 92.

[Expression 18]

$$D=2Nt\tan\theta, L=N(2t/\cos\theta) \qquad (18)$$

Based upon the relationship in the above-mentioned expression (18), for example, supposing that the distance D between the light-transmitting windows 96 and 97 is 22 mm, that the reflective angle θ is 5 degrees, and that the thickness t of the silica nano-porous member 2 is 4 mm, the number N of reciprocating repetitions on one way from the LDV head 8 to the mirror 92 is 31. At this time, since the optical path length on one way is about 249 mm, the optical path length as a whole is about 500 mm so that the optical path length that is about 60 times longer than that of the first embodiment is achieved, thereby making it possible to remarkably improve the sensitivity.

In the third embodiment, in addition to the functions and effects of the first embodiment, by utilizing a spatial expansion of the isophase wavefront of the sound wave that is propagated through the silica dried gel, the optical path length can be expanded so that the sensitivity of measurements on a change in refractive index can be remarkably improved.

By properly combining the arbitrary embodiments of the aforementioned various embodiments, the effects possessed by the embodiments can be produced.

INDUSTRIAL APPLICABILITY

In accordance with the optical ultrasonic microphone of the present invention, it becomes possible to receive an ultrasonic wave in a high frequency range with a wide band that has been difficult to receive by using a conventional technique, and consequently to achieve a standard microphone having an effective band of 100 kHz or more.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An optical ultrasonic microphone, which is a microphone for receiving a sound wave from an ambient space filled with a gas, the optical ultrasonic microphone comprising:
    a base that is provided with (i) an opening through which the sound wave is received from the ambient space and (ii) an acoustic waveguide for transmitting the sound wave received by the opening;
    a light source for applying light;
    an optical acoustic propagation medium portion held by the base, the optical acoustic propagation medium forming at least one portion of the acoustic waveguide through which the sound wave from the acoustic waveguide and the light from the light source are propagated;

a light detecting means for detecting the light emitted from the optical acoustic propagation medium portion and for detecting a modulation of the light caused by the sound wave; and an operation unit for finding a sound pressure from results of the detection by the light detecting means, wherein, between a density $\rho_a$ and a sound velocity $C_a$ of the gas with which the acoustic waveguide is filled, a density $\rho_n$ and a sound velocity $C_n$ of an optical acoustic propagation medium of the optical acoustic propagation medium portion are allowed to satisfy the following expression:

$$(\rho_a/\rho_n) < (C_n/C_a) < 1$$

and wherein the operation unit finds the sound pressure from the result of the detection by the light detecting means according to the following expression:

$$P = -C_n^2 \times \rho_n \times \frac{n}{n-1} \frac{\Delta L}{L} = -C_n^2 \times \rho_n \times \frac{n}{n-1} \frac{1}{L} \int v\, dt$$

where P is the sound pressure, $\rho_n$ is the density of the optical acoustic propagation medium, $C_n$ is the sound velocity of the optical acoustic propagation medium, L is the distance in which the sound wave and the light interfere with each other in the optical acoustic propagation medium, $\Delta L$ is a displacement output of the light detecting means, and v is a velocity output of the light detected by the light detecting means.

2. The optical ultrasonic microphone according to claim 1, wherein the optical acoustic propagation medium portion is constructed by a dried gel of an inorganic oxide or an organic polymer.

3. The optical ultrasonic microphone according to claim 2, wherein the dried gel has physical properties of a density of 100 kg/m³ or more and a sound velocity of 300 m/s or less.

4. The optical ultrasonic microphone according to claim 2, wherein the dried gel has a solid skeleton portion that is hydrophobized.

5. The optical ultrasonic microphone according to claim 1, wherein the light source is a laser light source.

6. The optical ultrasonic microphone according to claim 5, wherein the light detecting means detects a modulation of a frequency of laser light from the laser light source.

7. The optical ultrasonic microphone according to claim 6, wherein the light source and the light detecting means are formed by a laser Doppler detecting means so as to be compatibly used.

8. The optical ultrasonic microphone according to claim 1, wherein the acoustic waveguide has a height and a width that are ½ or less of a wavelength of an ultrasonic wave to be received by the microphone.

9. The optical ultrasonic microphone according to claim 1, wherein the acoustic waveguide is formed by the base and the optical acoustic propagation medium portion in such a manner that a height of the acoustic waveguide is narrowed toward a terminal side of the acoustic waveguide.

10. The optical ultrasonic microphone according to claim 1, wherein the ambient gas is air.

11. The optical ultrasonic microphone according to claim 1, wherein the light source and the light detecting means are formed by a laser Doppler detecting means so as to be compatibly used, and the laser Doppler detecting means has an optical axis that is disposed in a direction orthogonal to the sound wave propagation direction of the sound wave in which the sound wave proceeds into the optical acoustic propagation medium portion from one face of the optical acoustic propagation medium portion, and wherein the optical ultrasonic microphone further comprises a mirror, which is placed along the optical axis of the laser Doppler detecting means so as to face the laser Doppler detecting means, with an optical path being formed between the laser Doppler detecting means and the mirror inside the optical acoustic propagation medium portion.

12. An optical ultrasonic microphone comprising:

an acoustic waveguide member that has a first opening, for defining an acoustic waveguide for propagating a sound wave that is made incident thereon from the first opening in a sound wave propagation direction;

an optical acoustic propagation medium portion that has a transmitting face, and is formed in the acoustic waveguide so as to allow the transmitting face to form one face of the acoustic waveguide in a propagation direction of the sound wave so that the transmitting face is formed in such a manner that one portion of the sound wave is transmitted to the propagation medium portion from the transmitting face, as the sound wave is propagated through the acoustic waveguide, and converged to a converging point;

a light source for applying light to the converging point of the optical acoustic propagation medium portion;

a light detecting means for detecting the light emitted from the optical acoustic propagation medium portion so that a modulation of the light caused by the sound wave that is converged to the converging point is detected; and an operation unit for finding a sound pressure from results of the detection by the light detecting means, wherein the optical acoustic propagation medium portion included a propagation medium with which the gap between the transmitting face and the converging point is filled, wherein the acoustic wave guide is filled with an environmental fluid, and between a density $\rho_a$ and a sound velocity $C_a$ of the environmental fluid with which the acoustic waveguide is filled, a density $\rho_n$ and a sound velocity $C_n$ of the optical acoustic propagation medium of the optical acoustic propagation medium portion are allowed to satisfy the following expression:

$$(\rho_a/\rho_n) < (C_n/C_a) < 1$$

and wherein, supposing that a length of the acoustic waveguide from the first opening of the acoustic waveguide to an arbitrary point $P_k$ in a propagation direction of the sound wave on the transmitting face is $L_{ak}$ and that a length from the arbitrary point $P_k$ to the converging point is $L_{nk}$, the following relationship is satisfied relative to an arbitrary number k:

$$(L_{ak}/C_a) + (L_{nk}/C_n) = \text{const.}$$

13. The optical ultrasonic microphone according to claim 12, wherein an acoustic horn is connected to a front end of the first opening of the acoustic waveguide.

* * * * *